(12) United States Patent
Soss et al.

(10) Patent No.: US 7,903,090 B2
(45) Date of Patent: Mar. 8, 2011

(54) FORCE-BASED INPUT DEVICE

(75) Inventors: David A. Soss, Salt Lake City, UT (US);
James K. Elwell, Salt Lake City, UT (US); James R. Mullins, Centerville, UT (US)

(73) Assignee: QSI Corporation, Salt Lake City, UT (US)

( * ) Notice: Subject to any disclaimer, the term of this patent is extended or adjusted under 35 U.S.C. 154(b) by 468 days.

(21) Appl. No.: 11/402,694

(22) Filed: Apr. 11, 2006

(65) Prior Publication Data

US 2006/0279553 A1 Dec. 14, 2006

Related U.S. Application Data

(60) Provisional application No. 60/708,867, filed on Aug. 16, 2005, provisional application No. 60/689,731, filed on Jun. 10, 2005.

(51) Int. Cl.
*G06F 3/041* (2006.01)
(52) U.S. Cl. ......................................... 345/173; 345/184
(58) Field of Classification Search .......... 345/173–177, 345/168; 368/751
See application file for complete search history.

(56) References Cited

U.S. PATENT DOCUMENTS

| | | |
|---|---|---|
| 3,090,226 A | 5/1963 | Cortie et al. |
| 3,512,595 A | 5/1970 | Laiming |
| 3,657,475 A | 4/1972 | Peronneau et al. |
| 3,988,934 A | 11/1976 | Kamphoefner et al. |
| 4,094,192 A | 6/1978 | Watson et al. |
| 4,121,049 A | 10/1978 | Roeber |
| 4,127,752 A | 11/1978 | Lowthorp |
| 4,340,777 A | 7/1982 | DeCosta et al. |
| 4,355,202 A | 10/1982 | DeCosta et al. |
| 4,389,711 A | 6/1983 | Hotta et al. |
| 4,398,711 A | 8/1983 | Horst et al. |
| 4,511,760 A | 4/1985 | Garwin et al. |
| 4,550,384 A | 10/1985 | Kimura |

(Continued)

FOREIGN PATENT DOCUMENTS

DE 10312338 10/2004

(Continued)

OTHER PUBLICATIONS

Soss, David A., et al., U.S. Appl. No. 12/002,333, filed Dec. 14, 2007.

(Continued)

*Primary Examiner* — Quan-Zhen Wang
*Assistant Examiner* — Calvin C Ma
(74) *Attorney, Agent, or Firm* — Thorpe North & Western LLP

(57) ABSTRACT

Disclosed is an input device comprising (a) a base support, having a periphery and a plurality of apertures formed therein to define a circumscribed or circumscribing input pad configured to displace under the applied force; (b) a plurality of isolated beam segments, defined by the plurality of apertures, and operable to receive resultant forces distributed to the isolated beam segments by the displacement of the input pad; (c) at least two sensors, disposed along each isolated beam segment, and configured to measure the forces transmitted from the input pad to the periphery and to output a signal corresponding to the applied force. One or more processing means operable with the plurality of sensors may be utilized to receive the signal and to determine at least one of a location and/or magnitude of the applied force acting on the input pad.

37 Claims, 27 Drawing Sheets

U.S. PATENT DOCUMENTS

| | | |
|---|---|---|
| 4,558,757 A | 12/1985 | Mori et al. |
| 4,618,797 A | 10/1986 | Cline |
| 4,649,505 A | 3/1987 | Zinser, Jr. et al. |
| 4,675,569 A | 6/1987 | Bowman et al. |
| 4,726,436 A | 2/1988 | Fukuyama et al. |
| 4,745,565 A | 5/1988 | Garwin et al. |
| 4,771,277 A | 9/1988 | Barbee et al. |
| 4,805,739 A | 2/1989 | Lind et al. |
| 4,896,069 A | 1/1990 | Rosenberg et al. |
| 4,918,262 A | 4/1990 | Flowers et al. |
| 5,022,475 A | 6/1991 | Sato et al. |
| 5,038,142 A | 8/1991 | Flower et al. |
| 5,053,757 A | 10/1991 | Meadows |
| 5,142,183 A | 8/1992 | Burgess et al. |
| 5,170,087 A | 12/1992 | Karr et al. |
| 5,231,326 A | 7/1993 | Echols |
| 5,239,152 A | 8/1993 | Caldwell et al. |
| 5,241,139 A | 8/1993 | Gungl et al. |
| 5,241,308 A | 8/1993 | Young |
| 5,249,298 A | 9/1993 | Bolan et al. |
| 5,327,164 A | 7/1994 | Fagard et al. |
| 5,332,944 A | 7/1994 | Cline |
| 5,376,948 A | 12/1994 | Roberts |
| 5,412,189 A | 5/1995 | Cragun |
| 5,447,074 A | 9/1995 | Polaert et al. |
| 5,510,813 A | 4/1996 | Makinwa et al. |
| 5,541,372 A | 7/1996 | Baller et al. |
| 5,553,296 A | 9/1996 | Forrest et al. |
| 5,563,632 A | 10/1996 | Roberts |
| 5,572,573 A | 11/1996 | Sylvan et al. |
| 5,590,343 A | 12/1996 | Bolan et al. |
| 5,594,471 A | 1/1997 | Deeran et al. |
| 5,638,092 A | 6/1997 | Eng et al. |
| 5,673,066 A | 9/1997 | Toda et al. |
| 5,708,460 A | 1/1998 | Young et al. |
| 5,714,694 A | 2/1998 | Diessner |
| 5,777,239 A | 7/1998 | Fuglewicz |
| 5,854,625 A * | 12/1998 | Frisch et al. ............ 345/173 |
| 5,887,995 A | 3/1999 | Holehan |
| 5,917,906 A | 6/1999 | Thornton |
| 5,940,065 A | 8/1999 | Babb et al. |
| 5,974,558 A | 10/1999 | Cortopassi et al. |
| 5,982,355 A | 11/1999 | Jaeger et al. |
| 5,996,082 A | 11/1999 | Cortopassi |
| 6,088,023 A | 7/2000 | Louis et al. |
| 6,108,211 A * | 8/2000 | Diessner ............... 361/751 |
| 6,285,358 B1 | 9/2001 | Roberts |
| 6,310,428 B1 | 10/2001 | Pulli et al. |
| 6,323,846 B1 | 11/2001 | Westerman et al. |
| 6,445,383 B1 | 9/2002 | Chambers et al. |
| 6,466,140 B1 | 10/2002 | McGaffey et al. |
| 6,492,978 B1 | 12/2002 | Selig et al. |
| 6,504,530 B1 * | 1/2003 | Wilson et al. ............ 345/173 |
| 6,522,032 B1 | 2/2003 | Karnowka et al. |
| 6,715,359 B2 | 4/2004 | Lokhorst et al. |
| 6,756,700 B2 | 6/2004 | Zeng |
| 6,771,250 B1 | 8/2004 | Oh |
| 6,819,312 B2 | 11/2004 | Fish |
| 6,850,229 B2 | 2/2005 | Casebolt et al. |
| 6,909,345 B1 | 6/2005 | Barker |
| 6,954,867 B2 | 10/2005 | Casebolt et al. |
| 7,012,727 B2 | 3/2006 | Hutzel et al. |
| 7,102,621 B2 | 9/2006 | Roberts |
| 7,154,481 B2 | 12/2006 | Cross et al. |
| 7,154,483 B2 | 12/2006 | Kobayashi |
| 7,158,122 B2 | 1/2007 | Roberts |
| 7,176,897 B2 | 2/2007 | Roberts |
| 7,176,902 B2 | 2/2007 | Peterson, Jr. et al. |
| 7,183,948 B2 | 2/2007 | Roberts |
| 7,190,350 B2 | 3/2007 | Roberts |
| 7,196,694 B2 | 3/2007 | Roberts |
| 7,213,323 B2 | 5/2007 | Baker et al. |
| 7,265,746 B2 | 9/2007 | Knowles |
| 7,277,087 B2 | 10/2007 | Hill et al. |
| 7,337,085 B2 | 2/2008 | Soss |
| 2002/0015024 A1 | 2/2002 | Westerman et al. |
| 2002/0050984 A1 | 5/2002 | Roberts |
| 2002/0149571 A1 | 10/2002 | Roberts |
| 2002/0163509 A1 | 11/2002 | Roberts |
| 2002/0175386 A1 | 11/2002 | Kim et al. |
| 2002/0180710 A1 | 12/2002 | Roberts |
| 2003/0128191 A1 | 7/2003 | Strasser et al. |
| 2003/0206162 A1 | 11/2003 | Roberts |
| 2003/0210235 A1 | 11/2003 | Roberts |
| 2003/0214485 A1 | 11/2003 | Roberts |
| 2003/0214486 A1 | 11/2003 | Roberts |
| 2004/0040560 A1 | 3/2004 | Euliano et al. |
| 2004/0056845 A1 | 3/2004 | Harkcom et al. |
| 2004/0100448 A1 | 5/2004 | Moshrefzadeh |
| 2004/0125086 A1 | 7/2004 | Hagermoser et al. |
| 2004/0156168 A1 | 8/2004 | LeVasseur et al. |
| 2004/0156468 A1 | 8/2004 | Hamada et al. |
| 2004/0178997 A1 | 9/2004 | Gillespie et al. |
| 2004/0212583 A1 | 10/2004 | Cobian |
| 2004/0212602 A1 | 10/2004 | Nako et al. |
| 2005/0041018 A1 | 2/2005 | Philipp |
| 2005/0088417 A1 | 4/2005 | Mulligan |
| 2005/0146512 A1 | 7/2005 | Hill et al. |
| 2005/0146513 A1 | 7/2005 | Hill et al. |
| 2006/0071912 A1 | 4/2006 | Hill et al. |
| 2006/0279548 A1 | 12/2006 | Geaghan |
| 2006/0279553 A1 | 12/2006 | Soss et al. |
| 2006/0284856 A1 | 12/2006 | Soss |
| 2006/0293864 A1 | 12/2006 | Soss |
| 2007/0018965 A1 | 1/2007 | Paun et al. |
| 2007/0052690 A1 | 3/2007 | Roberts |
| 2007/0063983 A1 | 3/2007 | Huang et al. |
| 2007/0232951 A1 | 10/2007 | Euliano et al. |
| 2007/0257894 A1 | 11/2007 | Philipp |
| 2008/0068343 A1 | 3/2008 | Hoshino et al. |

FOREIGN PATENT DOCUMENTS

| | | |
|---|---|---|
| JP | 14175151 | 6/2002 |
| WO | WO 2006/104745 | 10/2006 |
| WO | WO 2007/035190 | 3/2007 |

OTHER PUBLICATIONS

Carusone et al., "Analogue Adaptive Filters; Past and Present," IEE Proc-Circuits Devices Syst., Feb. 2000, pp. 82-90, vol. 147, No. 1.
SeePoint, CounterPoint Touch Screen Kiosk, www.seepoint.com/CounterPoint.asp accessed Aug. 21, 2006, 2 pages.
Cybertouch—Orion 20 LCD touch screen LCD monitor, www.cybertouch.com/ORION20.html, accessed Aug. 21, 2006, 2 pages.
Soss, David, U.S. Appl. No. 11/402,985, filed Apr. 11, 2006.
Soss, David, U.S. Appl. No. 12/002,334, filed Dec. 14, 2007.
Flint, Randall, U.S. Appl. No. 12/353,178, filed Jan. 13, 2009.
Elwell, James K, U.S. Appl. No. 11/888,673, filed Jul. 31, 2007.
Soss, David, U.S. Appl. No. 12/069,098, filed Feb. 6, 2008.
Flint, Randall, U.S. Appl. No. 12/125,762, filed May 22, 2008.
Elwell, James K, U.S. Appl. No. 12/125,906, filed May 22, 2008.
Elwell, James K, U.S. Appl. No. 12/154,674, filed May 22, 2008.
Elwell, James K, U.S. Appl. No. 12/125,848, filed May 22, 2008.
Soss, David, U.S. Appl. No. 12/335,282, filed Dec. 15, 2008.

* cited by examiner

FORCE-BASED INPUT DEVICE

RELATED APPLICATIONS

This application claims the benefit of U.S. Provisional Patent Application Ser. No. 60/708,867 filed Aug. 16, 2005, entitled "Force-Based Input Device" and U.S. Provisional Patent Application Ser. No. 60/689,731 filed Jun. 10, 2005, entitled "Signal Conditioning in a Force-Based Touch Device," each of which is hereby incorporated by reference in their entirety for all purposes.

FIELD OF INVENTION

The present invention relates generally to input devices, and more particularly to force-based input devices configured with isolated beam segments designed to concentrate the applied force across the beam segments, wherein the force is measured and processed to obtain or derive specific characteristics about or related to the applied force, such as its location and magnitude as it relates to the input device.

BACKGROUND OF THE INVENTION AND RELATED ART

Input devices (e.g., a touch screen or touch pad) are designed to detect the application of an object and to determine one or more specific characteristics of or relating to the object as relating to the input device, such as the location of the object as acting on the input device, the magnitude of force applied by the object to the input device, etc. Examples of some of the different applications in which input devices may be found include computer display devices, kiosks, games, automatic teller machines, point of sale terminals, vending machines, medical devices, keypads, keyboards, and others.

Currently, there are a variety of different types of input devices available on the market. Some examples include resistive-based input devices, capacitance-based input devices, surface acoustic wave-based devices, force-based input devices, infrared-based devices, and others. While providing some useful functional aspects, each of these prior related types of input devices suffer in one or more areas.

Resistive-based input devices typically comprise two conductive plates that are required to be pressed together until contact is made between them. Resistive sensors only allow transmission of about 75% of the light from the input pad, thereby preventing their application in detailed graphic applications.

Capacitance-based input devices operate by measuring the capacitance of the object applying the force to ground, or by measuring the alteration of the transcapacitance between different sensors. Although inexpensive to manufacture, capacitance-based sensors typically are only capable of detecting large objects as these provide a sufficient capacitance to ground ratio. In other words, capacitance-based sensors typically are only capable of registering or detecting application of an object having suitable conductive properties, thereby eliminating a wide variety of potential useful applications, such as the ability to detect styli and other similar touch or force application objects. In addition, capacitance-based sensors allow transmission of about 90% of input pad light.

Surface acoustic wave-based input devices operate by emitting sound along the surface of the input pad and measuring the interaction of the application of the object with the sound. In addition, surface acoustic wave-based input devices allow transmission of 100% of input pad light, and don't require the applied object to comprise conductive properties. However, surface acoustic wave-based input devices are incapable of registering or detecting the application of hard and small objects, such as pen tips, and they are usually the most expensive of all the types of input devices. In addition, their accuracy and functionality is affected by surface contamination, such as water droplets.

Force-based input devices are configured to measure the location and magnitude of the forces applied to and transmitted by the input pad. Force-based input devices provide some advantages over the other types of input devices. For instance, they are typically very rugged and durable, meaning they are not easily damaged from drops or impact collisions. Indeed, the input pad (e.g., touch screen) can be a thick piece of transparent material, resistant to breakage, scratching and so forth. There are no interposed layers in the input pad that absorb, diffuse or reflect light, thus 100% of available input pad light can be transmitted. They are typically impervious to the accumulation of dirt, dust, oil, moisture or other foreign debris on the input pad. Force-based input devices comprise one or more force sensors that are configured to measure the applied force. The force sensors can be operated with gloved fingers, bare fingers, styli, pens pencils or any object that can apply a force to the input pad. Despite their advantages, force-based input devices are typically too large and bulky to be used effectively in many touch screen applications. Additionally, conventional force-based input devices, as well as most other types of input devices, are capable of registering touch from only one direction, or in other words, on one side of the input pad, thereby limiting the force-based input device to monitor or screen-type applications.

Infrared-based devices are operated by infrared radiation emitted about the surface of the input pad of the device. However, these are sensitive to debris, such as dirt, that affect their accuracy.

SUMMARY OF THE INVENTION

In light of the problems and deficiencies inherent in the prior art, the present invention seeks to overcome these by providing a force-based input device that can determine the location and magnitude of an applied force from either side of the input pad, and that has force sensors that are in, or very near, the plane of the input pad, thereby minimizing the height of the input pad, and also the effect of any forces parallel to the input pad.

In accordance with the invention as embodied and broadly described herein, the present invention features an input device suitable for determining location and magnitude of an applied force, comprising: a) a base support having a periphery and a plurality of apertures formed near the periphery to define an input pad configured to displace under the applied force; b) a plurality of isolated beam segments defined by the plurality of apertures and operable to receive resultant forces distributed to the isolated beam segments by the displacement of the input pad; and c) at least one sensor operable with each isolated beam segment to measure the strain within the respective isolated beam segment occurring as a result of various stresses being created by the displacement of the input pad in response to the applied force and transmitted to the periphery, the at least one sensor also being configured to output a signal corresponding to the applied force and the measured strain to be used to determine a location of the applied force.

Although use of a single sensor may be adequate, as indicated, using two or more sensors provides certain recognized advantages. For example, with two sensors, it may be possible to partially correct temperature effects, as well as to minimize the effects of strains occurring parallel to the sensor plane.

The present invention also features an input device configured to receive an applied force, the input device comprising: a) a first structural element supported in a fixed position; b) a second structural element operable with the first structural element, and dynamically supported to be movable with respect to the first structural element to define an input pad configured to displace under the applied force; c) a plurality of isolated beam segments joining said first and second structural elements, said isolated beam segments being operable to transfer forces between the first and second structural elements, and to receive resultant forces distributed to the isolated beam segments by the displacement of the input pad; and d) at least one sensor operable with each isolated beam segment to measure the strain within the respective isolated beam segment occurring as a result of various stresses transmitted to the isolated beam segments by the displacement of the input pad in response to the applied force, each of the sensors also being configured to output a signal corresponding to the applied force and the measured strain to be used to determine a location of the applied force.

The present invention further features an input device configured to receive an applied force, the input device comprising: a) a base support having a periphery and a plurality of grooves formed at the periphery and extending only partially through the base support, the grooves being configured to define an input pad movable with respect to the base support, the input pad being configured to displace under the applied force; b) a plurality of isolated beam segments defined by the plurality of grooves and operable to receive resultant forces distributed to the isolated beam segments by the displacement of the input pad; and c) at least one sensor operable with each isolated beam segment to measure the strain within the respective isolated beam segment occurring as a result of various stresses being created by the displacement of the input pad in response to the applied force and transmitted to the periphery, the at least one sensor also being configured to output a signal corresponding to the applied force and the measured strain to be used to determine a location of the applied force.

The present invention still further features a method for making a touch pad device, comprising the steps of: a) providing a base support capable of receiving an applied force; b) forming apertures through peripheral locations on the base support to define an input pad and a plurality of isolated beam segments operable to receive resultant forces distributed to the isolated beam segments by the displacement of the input pad; c) providing a plurality of sensors along each of the isolated beam segments to measure the strain within the plurality of isolated beam segments occurring as a result of various stresses created by the displacement of the input pad and transmitted to the peripheral locations in response to the applied force, and to output a signal corresponding to the applied force to be used to determine the location of said applied force.

The present invention still further features a method for determining at least one of location and magnitude of a force applied to an input pad, the method comprising: a) providing a base support having a periphery and a plurality of isolated beam segments formed by a plurality of apertures at the periphery that define an input pad configured to displace in response to the force, the isolated beam segments having located thereon at least one sensor; b) measuring the strain within the plurality of isolated beam segments, which strain occurs as a result of various stresses created by the displacement of the input pad in response to the force as applied thereto; c) generating an output signal from each of the sensors, the output signal corresponding to the measured strain; and d) processing the output signal from the at least two sensors to determine the location of the force applied to the input pad.

The present invention still further features a method for determining at least one of location and magnitude of a force applied to an input pad, the method comprising: a) providing a first structural element; b) providing a second structural element operable with the first structural element to define a plurality of apertures, and dynamically supporting one of said first and second structural elements with respect to the other, which is fixedly supported, to define an input pad configured to displace under the applied force, the plurality of apertures defining a plurality of isolated beam segments operable to transfer forces between the first and second structural elements, and to receive resultant forces distributed to the isolated beam segments by the displacement of the input pad; c) measuring the strain within the plurality of isolated beam segments, which strain occurs as a result of various stresses transmitted to the isolated beam segments by the displacement of the input pad in response to the applied force; d) generating an output signal corresponding to the measured strain; and e) processing the output signal to determine the location of the force applied to the input pad.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 6-A illustrates a bottom view of a section of a force-based input device in accordance with another embodiment of the present invention;

FIG. 8-C illustrates a bottom view of a section of a force-based input device in accordance with another embodiment of the present invention;

FIG. 8-D illustrates a bottom view of a section of a force-based input device in accordance with another embodiment of the present invention;

FIG. 12-A illustrates a basic diagram of the plurality of sensors of FIG. 12 as arrayed in a full bridge configuration;

FIG. 25b illustrates a side cross-sectional view of the touch pad and sealing means of FIG. 25.

DETAILED DESCRIPTION OF EXEMPLARY EMBODIMENTS

Figure 1:
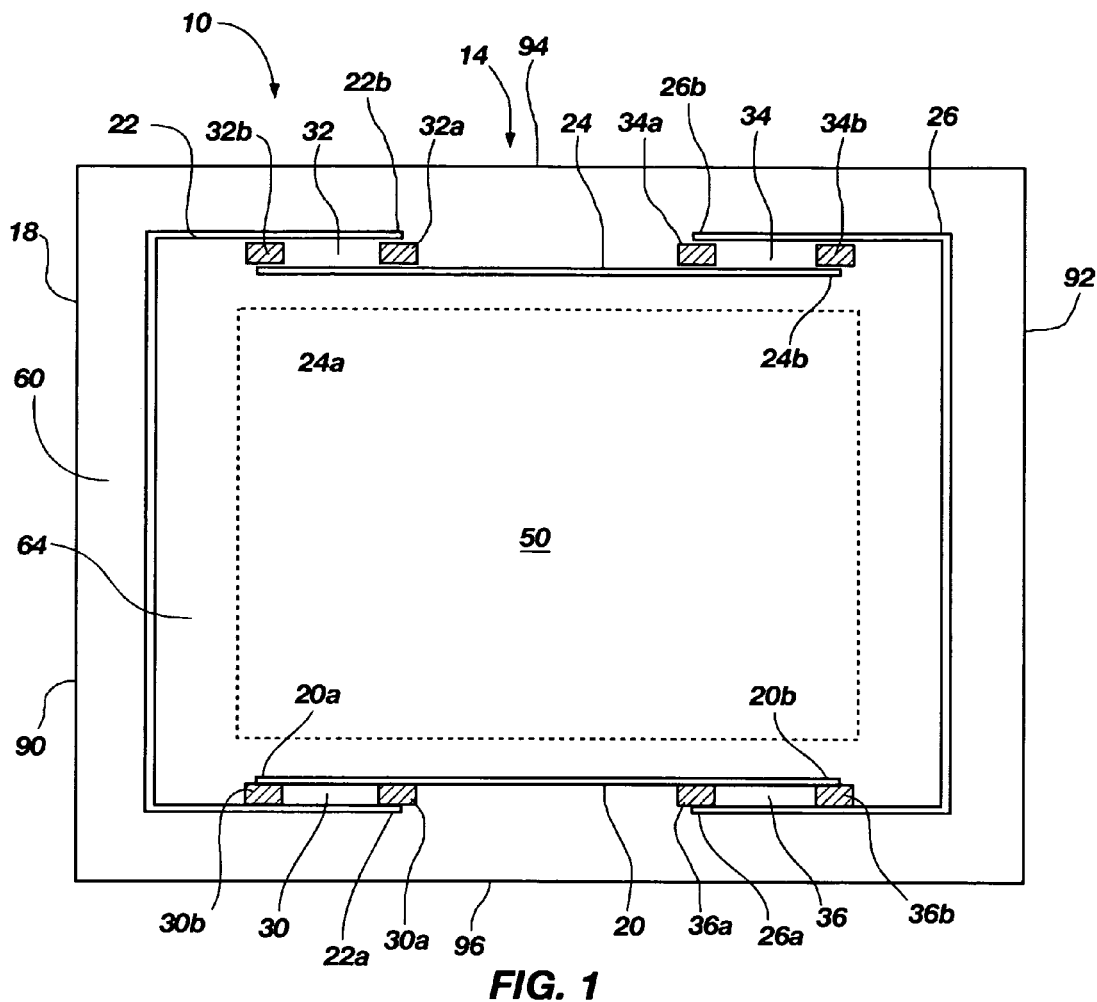
FIG. 1 illustrates a bottom view of a force-based input device in accordance with an embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 26, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Generally, the present invention describes a force-based input device and methods for making and using the same. The force-based input device is configured to determine the location and the magnitude of a force applied thereto. In some exemplary embodiments, the input device comprises a base support made of a material with suitable elasticity. The base support can be supported on its periphery by any suitable means. The force to be sensed and measured can be applied to an inner portion of the base support referred to herein as an input pad.

The base support may further comprise a plurality of beam segments disposed between the input pad and the periphery of the base support, thus preferably isolating the beam segments from the periphery. The isolated beam segments are configured to control the path of forces that are transmitted from the input pad to the periphery of the base support, and to concentrate the stresses imposed on the input pad by the applied force. The isolated beam segments may be in the form of slots, holes, or other relieved areas formed into the base support.

The force-based input device further comprises one or more sensors configured to be disposed or otherwise located along the isolated beam segments to provide a measure of the force being transmitted from the input pad to the periphery of the base support. The sensors function to measure the strain in the isolated beam segments resulting from stresses in the isolated beam segments caused by the applied force(s), and to provide a corresponding electrical output or signal. The stresses in the isolated beam segments result from the deflection of the input pad in response to application of the applied force(s). The electrical output or signal generated by the sensors can be further processed to derive the location coordinates of the applied force on the input pad, and the magnitude of the applied force. The output signals can also be processed to perform other functions, such as to correcting baseline activity.

In still other embodiments, the sensors may be integral with beam segments, wherein the beam segments comprise piezoelectric or other similar material. In other words, the beam segments themselves may be made of a material capable of functioning as a sensor, thus eliminating the need for separate sensors to be added to the beam segments.

The present invention provides several significant advantages over prior related force-based input devices. First, the force-based input device of the present invention can be very rugged, in that the pad is not easily damaged as a result of drops, impacts, or collisions. Second, the input pad may be configured as a transparent window, an opaque surface, or an integral part of the base support. In addition, the input pad may comprise any suitably elastic material. Third, the sensors can be impervious to accumulation of dirt, dust, oil, moisture or other foreign material on the window. Fourth, the sensors can detect force applied to the input pad by gloved fingers, bare fingers, styli, pens pencils, or any object capable of applying a force to the window. Fifth, the sensors may be configured to measure both the magnitude of the applied force, and also the location on the input pad where the force was applied. Sixth, the input pad and the base support may comprise a relatively thin planar configuration that can be easily affixed to typical display monitors or used as a stand alone interface device. Seventh, the configuration of the input pad and the one or more sensors is relatively insensitive to forces applied parallel to the input pad. Lastly, the force-based input device can detect and register forces applied to either side of the input pad, and can accurately determine the magnitude and location of the applied force.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

Figure 2:
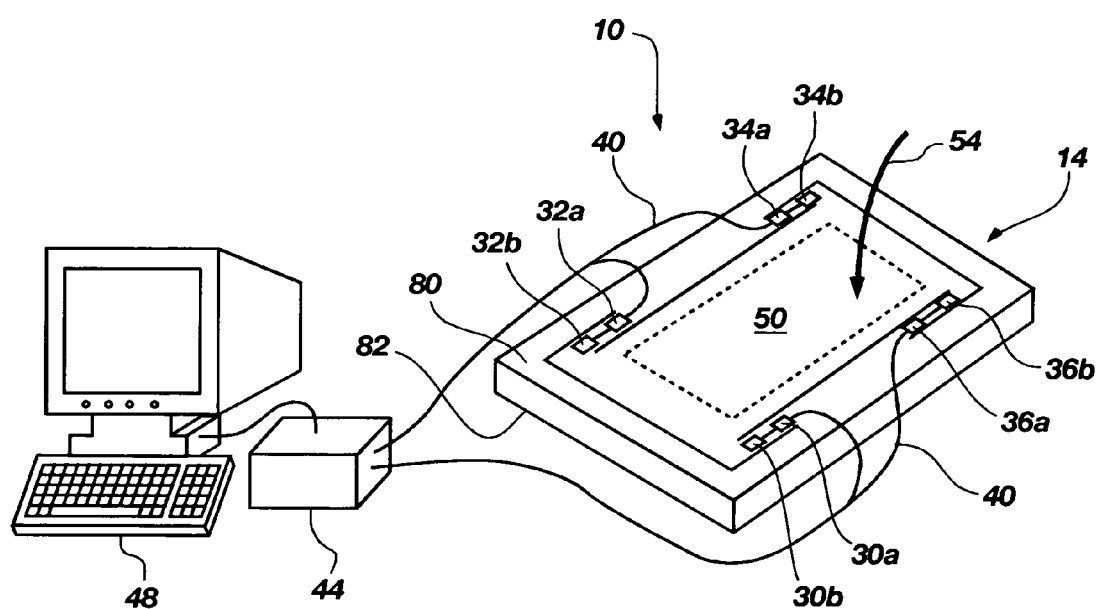
FIG. 2 illustrates a perspective view of a force-based input device connected to a signal processing means and a computer in accordance with an embodiment of the present invention.

As illustrated in FIGS. 1 and 2, a force-based input device 10 in accordance with an exemplary embodiment of the present invention is shown. The input device can have a base support 14 having an outer periphery 18. A plurality of apertures 20, 22, 24, and 26 can be formed in the base support 14 within the periphery 18. The apertures 20, 22, 24, and 26 can be located along the periphery 18 and can circumscribe and define a substantially rectangular input pad 50, shown by dashed lines in FIG. 1. The plurality of apertures can also define a plurality of isolated beam segments, 30, 32, 34, and 36, near the corners of, and parallel to the sides of the input pad 50. Two sensors (see sensors 30*a*, 30*b*, 32*a*, 32*b*, 34*a*, 34*b*, 36*a* and 36*b*) can be attached along each isolated beam segment 30, 32, 34, and 36, respectively. The sensors 30*a*, 30*b*, 32*a*, 32*b*, 34*a*, 34*b*, 36*a* and 36*b* are configured to detect and measure a force applied to the input pad 50. In addition, the sensors 30*a*, 30*b*, 32*a*, 32*b*, 34*a*, 34*c*, 36*a* and 36*b* are configured to output an electronic signal through a transmission device 40 attached or otherwise related to the sensors 30*a*, 30*b*, 32*a*, 32*b*, 34*a*, 34*b*, 36*a* and 36*b*, which signal corresponds to the applied force as detected by the sensors.

In one exemplary embodiment, the sensors 30*a*, 30*b*, 32*a*, 32*b*, 34*a*, 34*c*, 36*a* and 36*b* each comprise a strain gage configured to measure the strain within or across each of the respective isolated beam segments 30, 32, 34, and 36. Moreover, although each isolated beam segment 30, 32, 34, and 36 is shown comprising two sensors located or disposed thereon, the present invention is not limited to this configuration. It is contemplated that one, two or more than two sensors may be disposed along each of the isolated beam segments depending upon system constraints and other factors. In addition, it is contemplated that the sensors may be comprised of the beam segments themselves, if appropriately configured. The sensor are discussed in greater detail below.

The transmission device 40 is configured to carry the sensors' output signal to one or more signal processing devices, shown as signal processing device 44, wherein the signal processing devices function to process the signal in one or more ways for one or more purposes. For example, the signal processing devices may comprise analog signal processors, such as amplifiers, filters, and analog-to-digital converters. In addition, the signal processing devices may comprise a micro-computer processor that feeds the processed signal to a computer, as shown in FIG. 2. Or, the signal processing device may comprise the computer 48, itself. Still further, any combination of these and other types of signal processing devices may be incorporated and utilized. Typical signal processing devices are known in the art and are therefore not specifically described herein.

Processing means and methods employed by the signal processing device for processing the signal for one or more purposes, such as to determine the coordinates of a force applied to the force-based touch pad, are also known in the art. Various processing means and methods are discussed in further detail below.

With reference again to FIGS. 1 and 2, the base support 14 is shown comprising a substantially flat, or planar, pad or plate. The base support 14 can have an outer mounting surface 60 and an inner mounting surface 64 that can lie essentially within the same plane in a static condition. The outer mounting surface 60 can be located between the periphery 18 and the apertures 20, 22, 24, and 26. The inner mounting surface 64 can be located between the input pad 50 and the apertures 20, 22, 24, and 26. The isolated beam segments 30, 32, 34, and 36 can connect the inner mounting surface 64 with the outer mounting surface 60. The outer mounting surface 60 can be mounted to any suitably stationary mounting structure configured to support the input device 10. The input pad 50 can be a separate structure mounted to the inner mounting surface 64, or it may be configured to be an integral component that is formed integrally with the inner mounting surface 64. In the embodiment where the input pad is a separate structure, one or more components of the input pad can be configured to be removable from the inner mounting surface. For example, the input pad 50 may comprise a large aperture formed in the base support 14, and a removable force panel configured to be inserted and supported within the aperture, which force panel functions to receive the applied force thereon from either direction.

The base support 14 can be formed of any suitably inelastic material, such as a metal, like aluminum or steel, or it can be formed of a suitably elastic, hardened polymer material, as is known in the art. In addition, the base support 14 may be formed of glass, ceramics, and other similar materials. The base support 14 can be shaped and configured to fit within any type of suitable interface application. For example, the base support can be configured as the viewing area of a display monitor, which is generally rectangular in shape. In addition, the base support 14 can be configured to be relatively thin so that the touch surface of the input pad of the base support is only minimally offset from the viewing area of a display monitor, thereby minimizing distortion due to distance between the input pad and the display monitor.

It is noted that the performance of the input device may be dependent upon the stiffness of the outer portion or outer mounting surface of the base support 14. As such, the base support 14, or at least appropriate portions thereof, should be made to comprise suitable rigidity or stiffness so as to enable the input device to function properly. Alternatively, instead of making the base support 14 stiff, the base support 14, or at least a suitable portion thereof, may be attached to some type of rigid support. Suitable rigidity functions to facilitate more accurate input readings.

The input pad 50 can be a substantially flat, or planar, pad or plate and can lie within the same plane as the base support 14. The input pad 50 can be circumscribed by the apertures 20, 22, 24, and 26.

The input pad 50 is configured to displace in response to various stresses induced in the input pad 50 resulting from application of a force, shown as arrow 54 in FIG. 2, acting on the input pad 50. The input pad 50 is further configured to transmit the stresses induced by the applied force 54 to the inner mounting surface 64 and eventually to the isolated beam segments 30, 32, 34, and 36 where resulting strains in the isolated beam segments are induced and measured by the one or more sensors.

The base support 14 and input pad 50 can have a first side 80 and a second side 82. The present invention force-based input device 10 advantageously provides for the application of force to either the first or second sides 80 and 82 of the input pad 50, and the input pad 50 may be configured to displace out of the plane of the base support 14 in either direction in response to the applied force 54.

The input pad 50 can be formed of any suitably rigid material that can transfer, or transmit the applied force 54. Such a material can be metal, glass, or a hardened polymer, as is known in the art.

The isolated beam segments 30, 32, 34, and 36 can be formed in the base support 14, and may be defined by the plurality of apertures 20, 22, 24, and 26. The isolated beam segments 30, 32, 34, and 36 can lie essentially in the same plane as the base support 14 and the input pad 50 when in a static condition. In some embodiments, the apertures 20, 22, 24, and 26 may be configured to extend all the way through the base support 14. For example, the apertures 20, 22, 24, and 26 can be through slots or holes. In other embodiments, the apertures 20, 22, 24, and 26 may be configured to extend only partially through the base support 14.

As illustrated in FIG. 1, the isolated beam segment 32 can be formed or defined by the apertures 22 and 24. Aperture 22 can extend along a portion of the periphery 18 and have two ends 22a and 22b. The aperture 24 can extend along another portion of the periphery and have two ends 24a and 24b. Portions of the two apertures 22 and 24 can extend along a common portion of the periphery 18 where one end 22b of aperture 22 overlaps an end 24a of aperture 24. The two ends 22b and 24a, and the portions of the apertures 22 and 24 that extend along the common portion of the periphery 18, can be spaced apart on the base support 14 a pre-determined distance. The portion of the aperture 22 that extends along the common portion of the periphery 18 can be closer to the periphery 18 than portion of the aperture 24 that extends along the common portion of the periphery 18. The area of the base support 14 between the aperture 22 and the aperture 24, and between the end 22b and the end 24a, can define the isolated beam segment 32.

The isolated beam segments 30, 34, and 36 can be similarly formed and defined as described above for isolated beam segment 32. Isolated beam segment 30 can be formed by the area of the base support 14 between the apertures 24 and 20, and between the ends 24a and 20a. Isolated beam segment 34 can be formed by the area of the base support 14 between the apertures 24 and 26, and between the ends 24b and 26b. Isolated beam segment 36 can be formed by the area of the base support 14 between the apertures 26 and 20, and between the ends 26a and 20b. Thus, all of the isolated beam segments can be defined by the various apertures formed within the base support 14. In addition, the isolated beam segments may be configured to lie in the same plane as the plane of the input pad 50 and base support 14, as noted above.

The plurality of apertures 20, 22, 24, and 26 can nest within each other, wherein apertures 22 and 26 extend along the sides 90 and 92 of the rectangular base support 14, and can turn perpendicular to the short sides 90 and 92 and extend along at least a portion of the sides 94 and 96 of the base support 14. Apertures 20 and 24 can be located along a portion of the sides 94 and 96 of the base support 14 and closer to the input pad 50 than apertures 22 and 26. Thus, apertures 20 and 24 can be located or contained within apertures 22 and 26. Stated differently, the apertures may each comprise a segment that overlaps and runs parallel to a segment of another aperture to define an isolated beam segment, thus allowing the isolated beam segments to comprise any desired length.

Figure 1A:
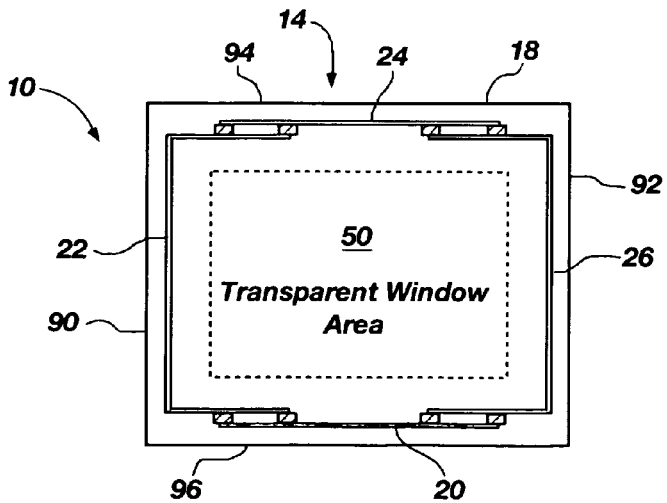
FIG. 1a illustrates a bottom view of a force-based input device in accordance with another embodiment of the present invention.

With respect to FIG. 1a, an alternative exemplary embodiment of the present invention input device 10 is illustrated. This particular embodiment is similar to the one described above and shown in FIG. 1, only the apertures 20 and 24 are located closer to the periphery 18 than apertures 22 and 26. In other words, apertures 20 and 24 are configured to lie outside the apertures 22 and 26.

Figure 3:
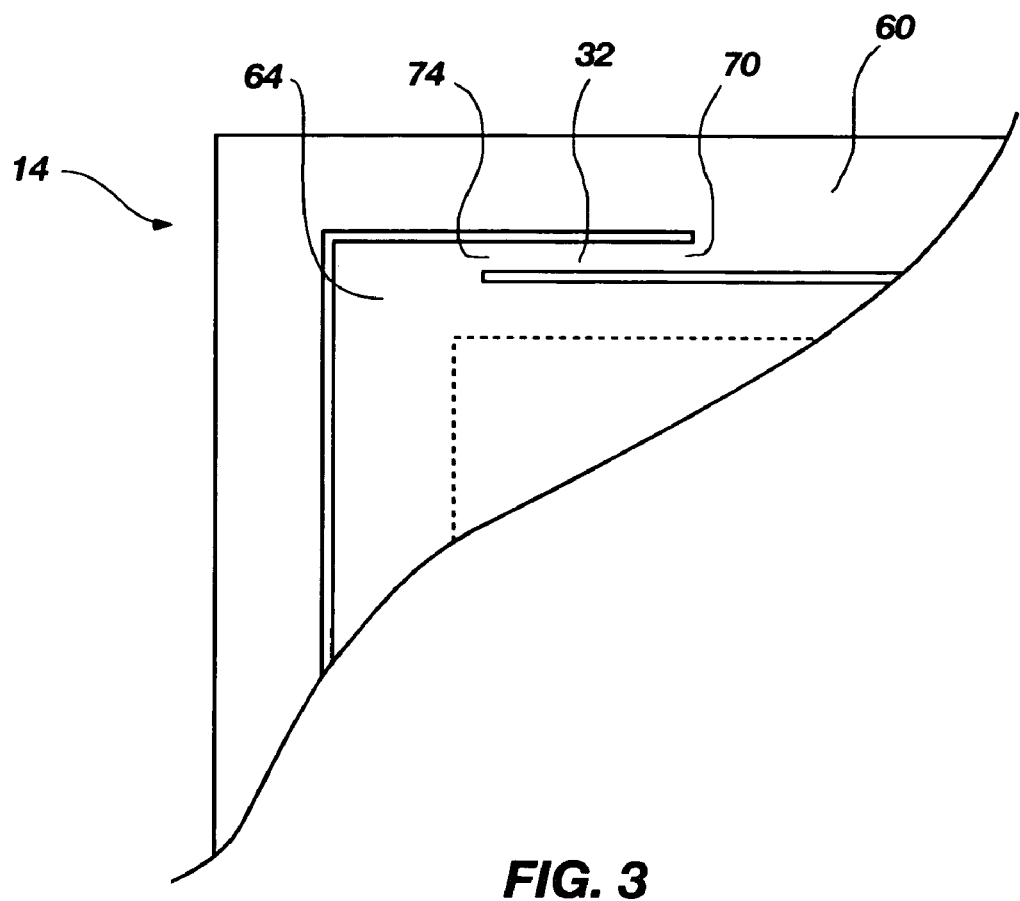
FIG. 3 illustrates a bottom view of a section of a force-based input device in accordance with the embodiment illustrated in FIG. 1.

As illustrated in FIG. 3, the isolated beam segments 30, 32, 34, and 36 can have an outer or periphery juncture 70, formed with the outer mounting surface 60, and an inner juncture 74, formed with the inner mounting surface 64 of the base support 14, as shown for isolated beam segment 32 in FIG. 3. The inner juncture 74 and outer juncture 70 are configured to receive and concentrate the stresses induced on the base support 14 by the applied force 54 by deflecting or bending in opposite directions. Upon the application of a force to the input pad 50, the resultant forces are transmitted through the input pad 50 to the various isolated beam segments as a result of the configuration of the isolated beam segments, and specifically the inner and outer junctures 70 and 74, in relation to the input pad 50 and the inner mounting surface 64. For example, returning to FIGS. 1 and 2, when a force is applied to the input pad 50, the input pad 50 displaces and induces stresses in the input pad 50. These stresses can be transmitted from the input pad 50 to the inner mounting surface 64, and ultimately to the isolated beam segments 30, 32, 34, and 36. Upon receiving the forces or stresses, the isolated beam segments 30, 32, 34, and 36 are configured to deflect in response to the displacement of the input pad 50 in response to the force being applied to the input pad 50. Thus, the force applied to the input pad 50 and the resultant stresses induced in the input pad 50 can be directed to and concentrated in the isolated beam segments 30, 32, 34, and 36. The concentrated stresses can result in deflection of the isolated beam 30, 32, 34, and 36 segments, and the deflection can be measured by the sensors 30a, 30b, 32a, 32b, 34a, 34b, 36a and 36b. The combination of providing isolated beam segments, and particularly isolated beam segments that lie in or substantially in the same plane as the input pad, and configuring the input device to concentrate the stresses on the input pad within the isolated beam segments, as well as the coplanar or substantial coplanar relationship of the force sensors with the touch surface or input pad, provides significant advantages over prior related input devices, including, but not limited to, being able to create the entire input device, including the mounting elements, from a single piece of material by means of appropriately positioning the apertures in the material; being able to reduce the sensitivity to longitudinal forces or moments transmitted to the touch surface; being mechanically simple; being able to eliminate preload springs; being able to provide a rugged and robust design that protects the input device from the environment; being able to minimize size and weight by making the sensors integral with and coplanar to the input pad; and being able to register forces from either side of the input pad. Furthermore, ceramic piezoelectric transducers deployed in the more sensitive longitudinal mode with the strain applied perpendicular to the axis of the poles and parallel to the electrodes makes the sensors more sensitive to elongation or strain and less sensitive to shear and transverse forces, thereby reducing the need for elaborate mechanisms to isolate the transducers from unwanted forces and moments.

The sensors 30a, 30b, 32a, 32b, 34a, 34b, 36a and 36b can be located along each isolated beam segment 30, 32, 34, and 36 essentially in the same plane as the base support 14 and the input pad 50 when in a static condition. Specifically, as shown in FIGS. 1 and 2, a sensor can be located at each end of each isolated beam segment. Thus, a sensor 30a can be located on an isolated beam segment 30 near the end 22a of one aperture 22. Similarly, another sensor 30b can be located on the isolated beam segment 30 near the end 20a of the aperture 20. The sensors 32a and 32b can be located on isolated beam segment 32 near each aperture end 22b and 24a respectively. The sensors 34a and 34b can be located on isolated beam segment 34 near each aperture end 26b and 24b respectively. The sensors 36a and 36b can be located on isolated be segment 36 near each aperture end 26a and 20b respectively.

The sensors 30a, 30b, 32a, 32b, 34a, 34b, 36a and 36b can also be located along each isolated beam segment 30, 32, 34, and 36 in a different plane than the base support 14 and the input pad 50 when in a static condition. The sensors 30a, 30b, 32a, 32b, 34a, 34b, 36a and 36b do not necessarily have to be in the same plane as the input pad 50, but preferably lie within the same plane with respect to one another. A plane containing all the sensors 30a, 30b, 32a, 32b, 34a, 34b, 36a and 36b is hereinafter referred to as the sensor plane. For example, an isolated beam segment having a side in the same plane as the input pad 50, and a side in an offset plane from the input pad 50 can have the sensor plane located on the side that is in the same plane as the input pad 50, or can have the sensor plane located on the side that is offset, but parallel to the plane of the input pad 50.

The sensors 30a, 30b, 32a, 32b, 34a, 34b, 36a and 36b are configured to measure the deflection in the isolated beam segments 30, 32, 34, and 36 caused by the applied force 54 on the input pad 50. The sensors 30a, 30b, 32a, 32b, 34a, 34b, 36a and 36b can be any type of sensor capable of measuring properties related to displacement of the isolated beam segments 30, 32, 34, and 36. For example, the sensors can be strain gages, capacitance gages, liquid level gages, laser level gages, or any suitable gage as is known in the art. The sensors 30a, 30b, 32a, 32b, 34a, 34b, 36a and 36b can generate an electrical signal corresponding to the displacement of the isolated beam segments 30, 32, 34, and 36. The electrical signal can be transmitted from the sensors 30a, 30b, 32a, 32b, 34a, 34b, 36a and 36b via a transmission means.

The transmission means 40 may comprise a wired or wireless transmission means, including for example, electrical wires 40 as shown in FIG. 2, radio transmitter, or optical communication devices, as known in the art. The transmission means 40 is configured to carry the signal output by each of the various sensors to a processing means 44 and 48 configured to receive and analyze the signal to determine the location and magnitude of the applied force 54 on the input pad 50. The processing means and analysis methods can be any known in the art.

Figure 4:
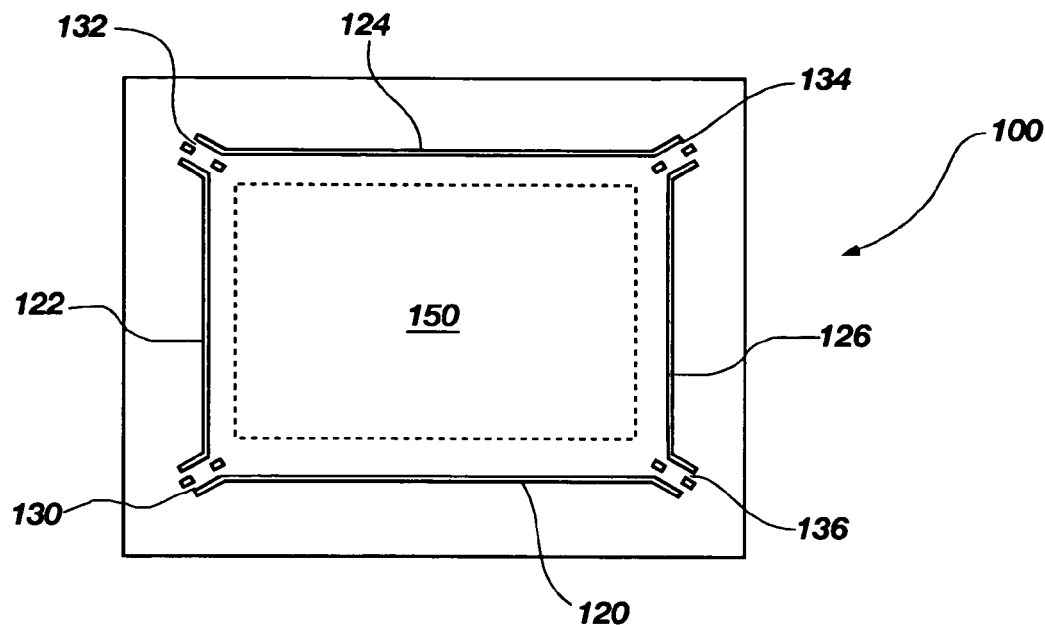
FIG. 4 illustrates a bottom view of a force-based input device in accordance with another embodiment of the present invention.

The present invention force-based input device may comprise several different embodiments, each of which function in a similar manner as the exemplary embodiment described above. Several specific embodiments are shown in the figures and set forth herein, however, these are not intended to be limiting in any way. It is contemplated that other embodiments may fall within the scope of the present invention that are not specifically set forth herein. With reference to FIG. 4, illustrated is a force-based input device 100 including a plurality of apertures 120, 122, 124, and 126 that defines a substantially rectangular input pad 150 and the isolated beam segments 130, 132, 134, and 136 are defined near the corners of, and at an angle to the sides of the input pad 150. It is believed that orienting the isolated beam segments 130, 132, 134, and 136 at an angle to the sides of the apertures 120, 122, 124, and 126 further enhances the stress concentrating ability of the isolated beam segments 130, 132, 134, and 136. Namely, the stresses induced in the isolated beam segments 130, 132, 134, and 136 have a higher magnitude and provide a more reliable analysis of the location and magnitude of the force applied to the input pad 150. In addition, more symmetrical distortion may be realized by this design.

Figure 4A:
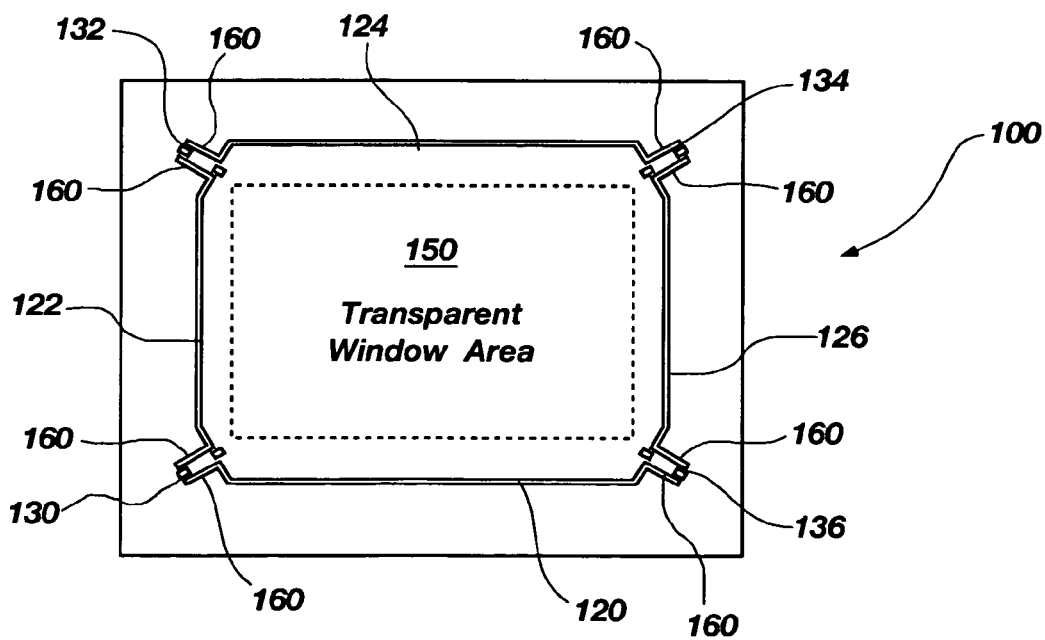
FIG. 4a illustrates a bottom view of a force-based input device in accordance with another embodiment of the present invention.

Illustrated in FIG. 4a is an alternative embodiment of the input pad illustrated in FIG. 4 and described above. Specifically, each aperture 120, 122, 124, and 126 can have a portion 160 on each end that angles toward the adjacent aperture. For example, the end portions 160 of aperture 124 can be angled toward the apertures 122 and 126 respectively. Each aperture can then turn perpendicular to the angled portion and extend away from input pad 150, thus defining the plurality of isolated beam segments 130, 132, 134, and 136 at angles to the sides of the input pad.

Figure 5:
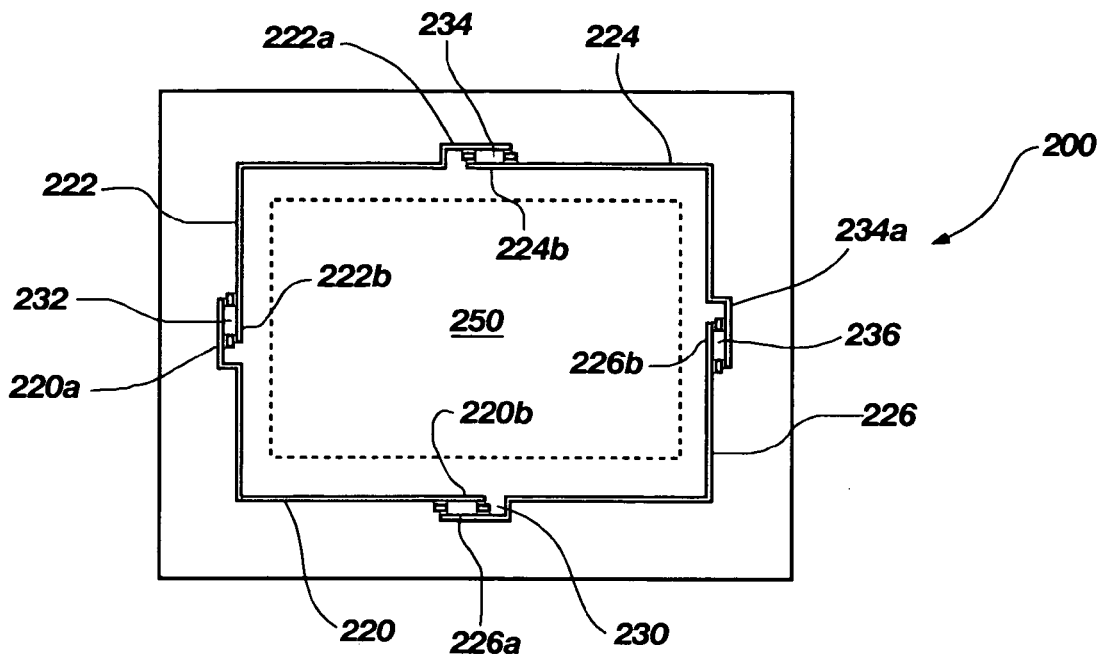
FIG. 5 illustrates a bottom view of a force-based input device in accordance with another embodiment of the present invention.

With reference to FIG. 5, illustrated is a force-based input device 200 including a plurality of apertures 220, 222, 224, and 226 that define a rectangular input pad 250 and the isolated beam segments 230, 232, 234, and 236 are defined near the center of, and parallel to the sides of the input pad 250. Each of the apertures 220, 222, 224, and 226 comprises a dog leg 220a, 222a, 224a, and 226a on one end that extends away from the input pad 250 and encloses those ends 220b, 222b, 224b, and 226b of the adjacent aperture not comprising a dog leg. It is believed that defining the isolated beam segments 230, 232, 234, and 236 near the center of, and parallel to the sides of the apertures 220, 222, 224, and 226 de-sensitizes the stress concentrating ability of the isolated beam segments 230, 232, 234, and 236. Namely, the stresses induced in the isolated beam segments 230, 232, 234, and 236 can have a lower magnitude and allow a greater force to be applied to the input pad 250 without overloading the sensors. In addition, centering the isolated beam segments along the edges may make the sensor(s) located on these beam segments less sensitive to distortion, such as that resulting from diagonal warping of the base support. However, when the sensor(s) is/are touched near the corners the outputs can become negative. As a result, this configuration may be subject to increased distortions from other effects, such as warping of the input pad 250.

Figure 5A:
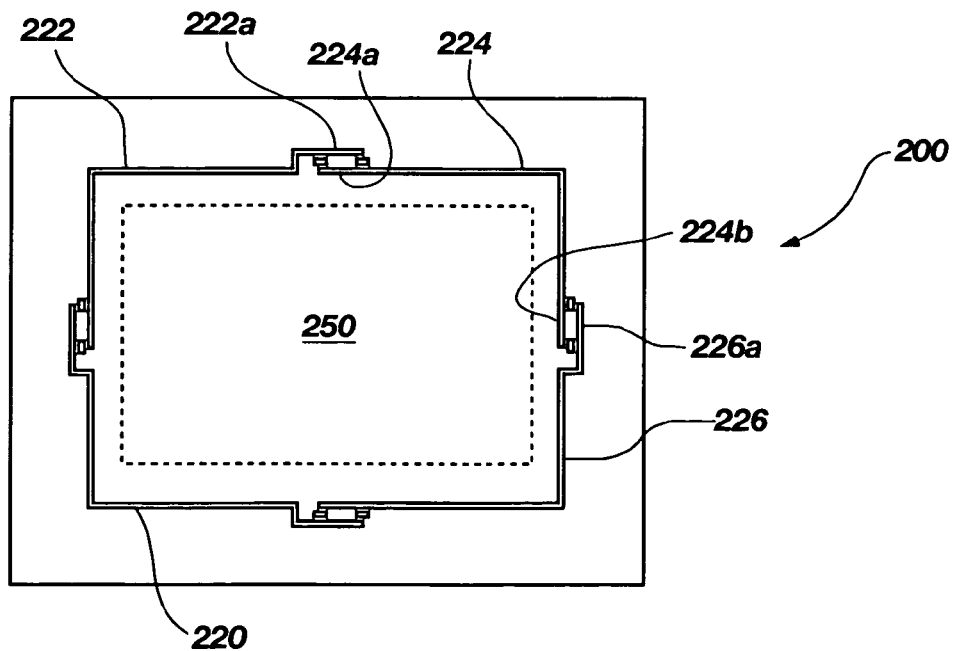
FIG. 5a illustrates a bottom view of a force-based input device in accordance with another embodiment of the present invention.

Illustrated in FIG. 5a is an alternative embodiment of the input pad illustrated in FIG. 5 and described above. In this embodiment, aperture 224 can have two ends 224a and 224b that do not have dog legs. The dog leg ends of apertures 222 and 226 can encompass the aperture 224.

Figure 6:
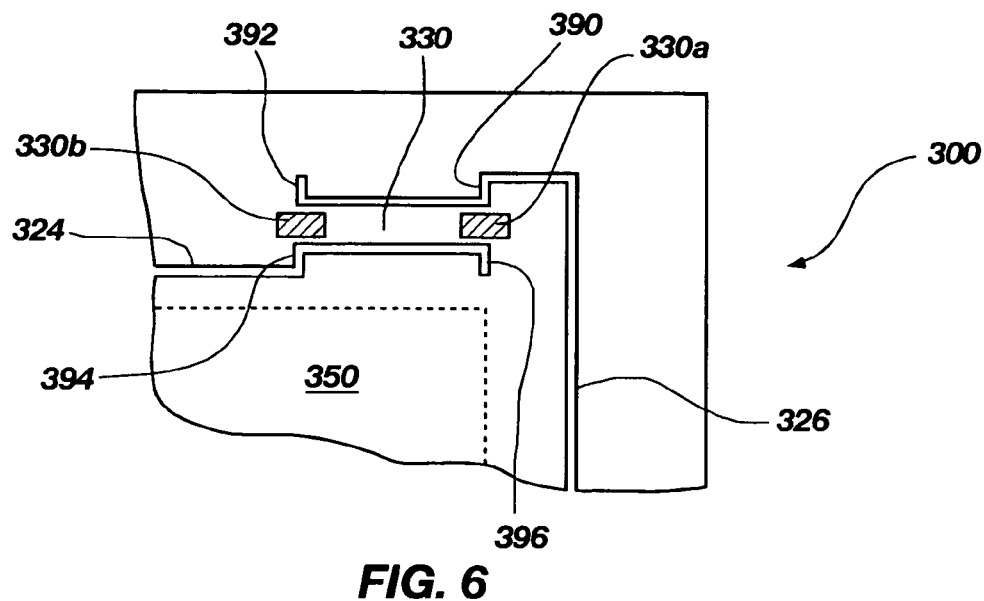
FIG. 6 illustrates a bottom view of a section of a force-based input device in accordance with another embodiment of the present invention.

With reference to FIG. 6, illustrated is a corner of a force-based input device 300 including a plurality of apertures 324 and 326 that define a rectangular input pad 350 having an isolated beam segment 330 defined near the corner of, and parallel to the sides of the input pad 350. The plurality of apertures 324 and 326 can have perpendicular extensions that abruptly change directions, such as directional apertures 390, 392, 394, 396, occurring at the locations of the sensors 330*a* and 330*b*. It is believed that providing abrupt directional apertures 390, 392, 394, 396 oriented in an orthogonal direction with respect to the longitudinal orientation of the isolated beam segments near the location of the sensors further enhances the stress concentrating ability of the isolated beam segments. In addition, providing such abrupt directional apertures is believed to provide a gradient that functions to smooth out the strain across the beam segments. More specifically, these abrupt directional apertures function to make more uniform the stresses and resulting strains in the direction perpendicular to the isolated beam segments. Although the beam segment 330 comprises apertures 390, 392, 394, and 396 of an abrupt directional change that are shown as being perpendicular to the beam segment 330, other aperture orientations are contemplated, such as apertures oriented at acute or orthogonal angles with respect to the longitudinal orientation of the beam segment 330.

Figure 6A:
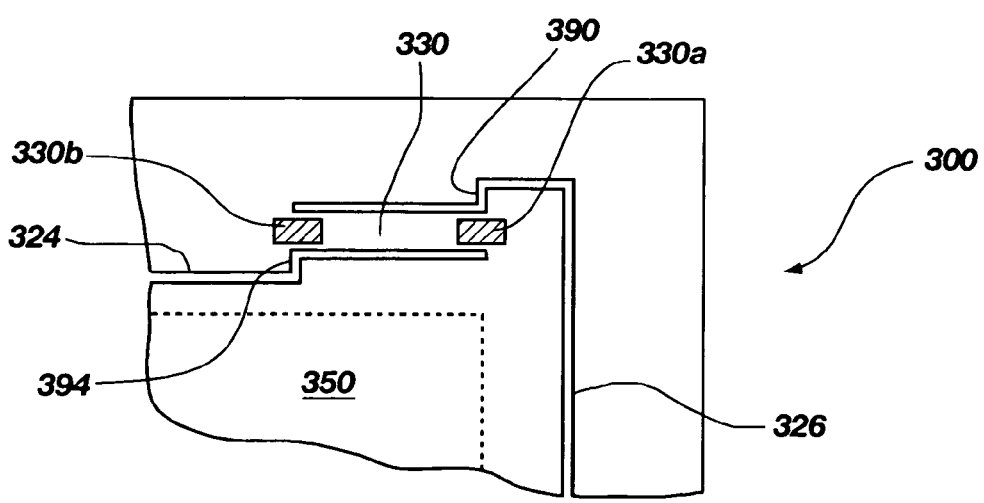

Illustrated in FIG. 6*a* is an alternative embodiment of the input pad illustrated in FIG. 6 and described above. The plurality of apertures 324 and 326 can have perpendicular direction changes 390, and 394 corresponding to the locations of the sensors 330*a* and 330*b*.

Figure 7:
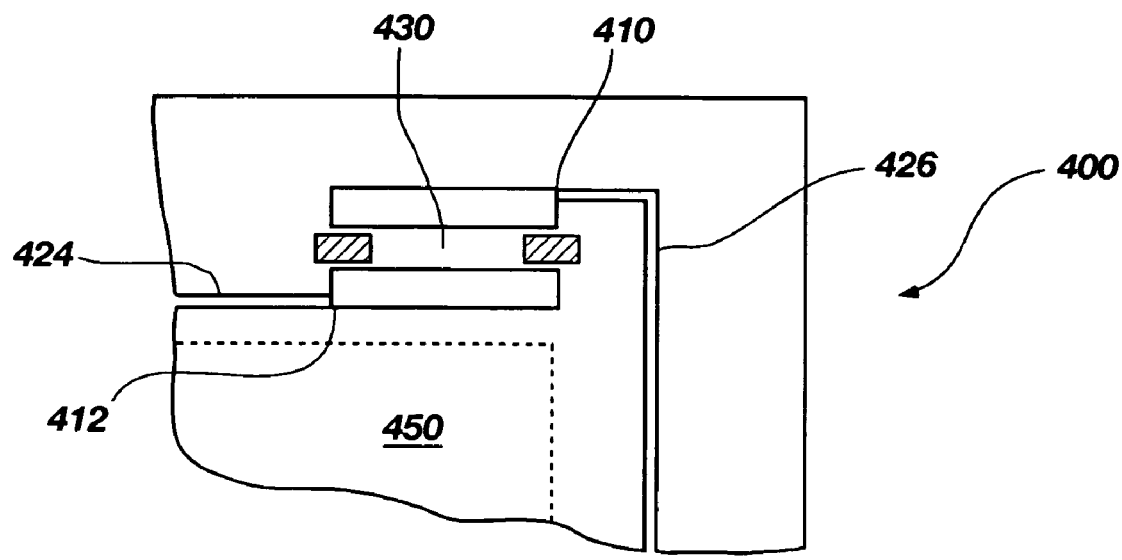
FIG. 7 illustrates a bottom view of a section of a force-based input device in accordance with another embodiment of the present invention FIG. 8-A illustrates a bottom view of a section of a force-based input device in accordance with another embodiment of the present invention.
Figure 8A:
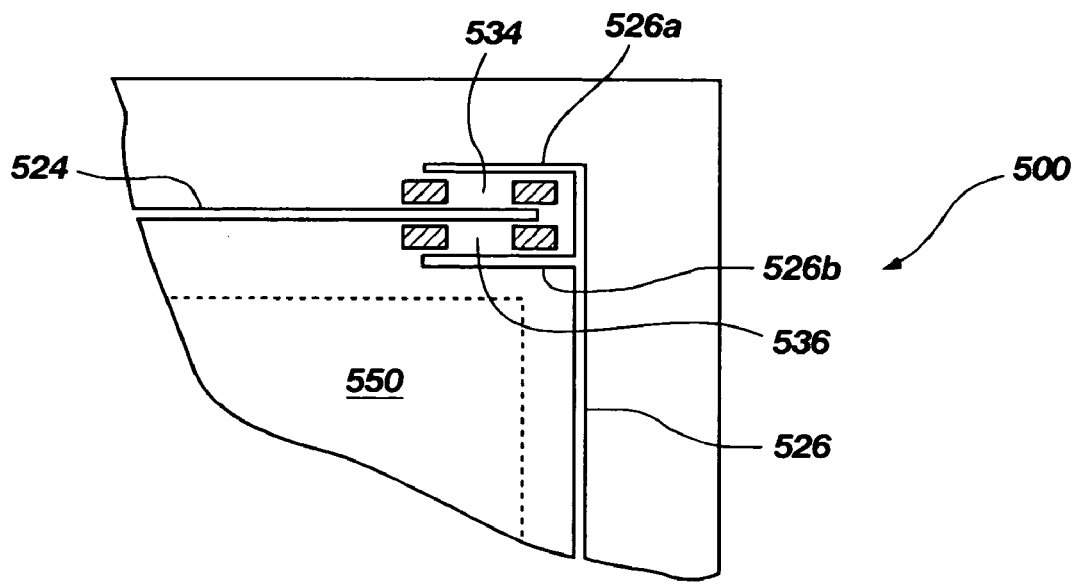
FIG. 8-B illustrates a bottom view of a section of a force-based input device in accordance with another embodiment of the present invention.
Figure 8B:
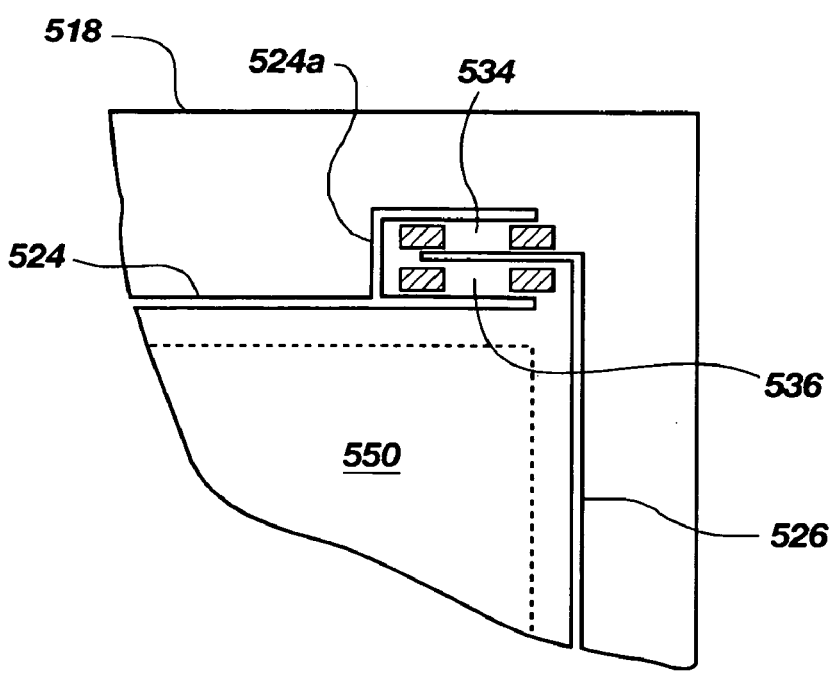
Figure 8C:
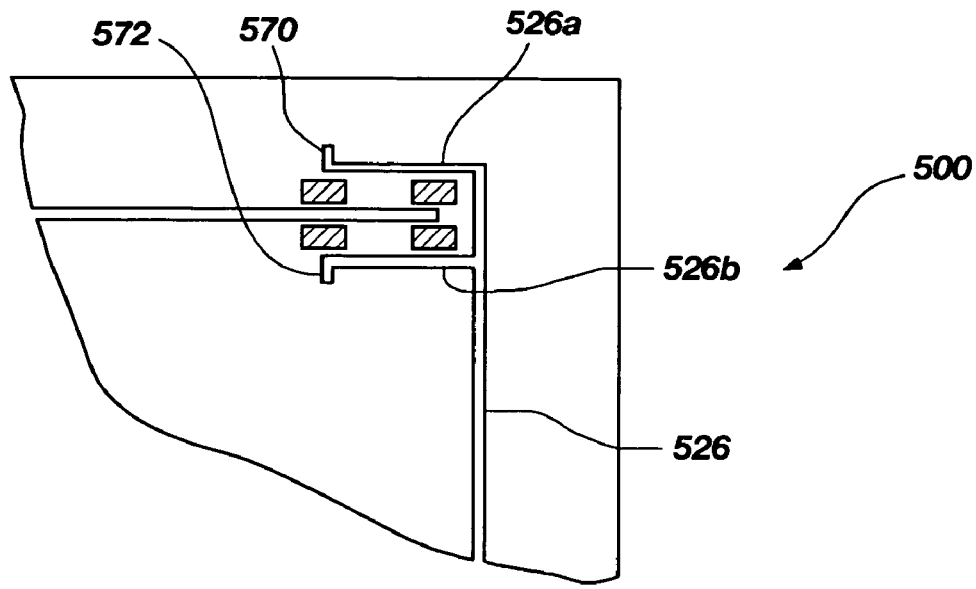
Figure 8D:
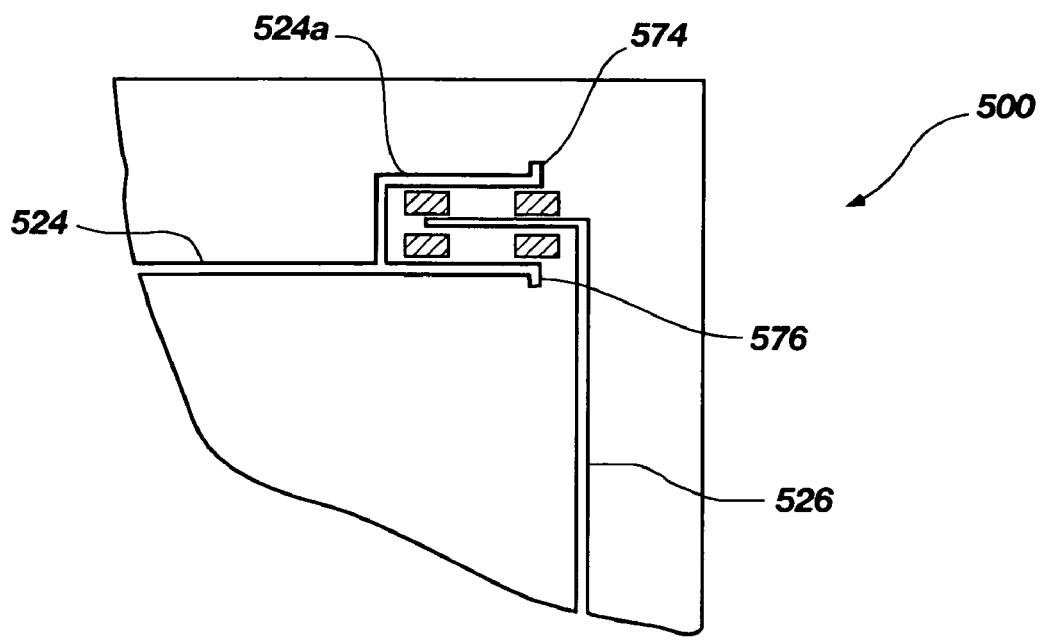

With reference to FIG. 7, illustrated is a force-based input device 400 including a plurality of apertures 424 and 426 that define a rectangular input pad 450 having isolated beam segments 430 defined near the corner of, and parallel to the sides of the input pad 450. The plurality of apertures 424 and 426 comprise a change in width and increase ii size along the isolated beam segments 430. This increase in size is represented by apertures 410 and 412. It is believed that this change in width adjacent to isolated beam segments enhances the stress concentrating ability of the isolated beam segments.

With reference to FIG. 8, illustrated is a force-based input device 500 including a plurality of apertures 524 and 526 that can define a rectangular input pad 550 and two adjacent isolated beam segments 534 and 536 near the corner of, and parallel to the sides of the input pad 550. The aperture 526 can have two parallel legs 526*a* and 526*b* that extend perpendicularly away from the aperture 526 and toward the adjacent aperture 524. The aperture 524 can extend between the parallel legs and split the isolated beam into two parallel segments 534 and 536. It is believed that having two adjacent and parallel isolated beam segments 534 and 536 enhances the measurement accuracy of the sensors.

Illustrated in FIG. 8-B is an alternative embodiment of the input pad illustrated in FIG. 8-A and described above. The aperture 524 can have a dog leg 524*a* that extends perpendicularly away from the aperture 526 and toward the periphery 518. The dog leg can turn perpendicularly toward the adjacent aperture 526 so that the dog leg 524*a* and the aperture 524 can extend, spaced apart and parallel, toward the adjacent aperture 526. The aperture 526 can perpendicularly change direction toward the aperture 524 and can extend between the parallel dog leg 524*a* and aperture 524 and split the isolated beam into two segments 534 and 536.

Illustrated in FIG. 8-C is an alternative embodiment of the input pad illustrated in FIG. 8-A and described above. The parallel legs 526*a* and 526*b* of the aperture 526 can have perpendicular directional changes 570 and 572 at their ends. It is believed that the perpendicular directional changes 570 and 572 enhance the stress concentration ability of the isolated beam segments. In addition, the perpendicular directional changes in the apertures function to smoothen the stress and resulting strain, therefore making these more uniform, in the direction perpendicular to the isolated beam segments. Furthermore, the reduction in stress concentration due to the perpendicular direction changes can increase the degree of force overload the input pad can withstand without permanent damage.

Illustrated in FIG. 8-D is an alternative embodiment of the input pad illustrated in FIG. 8-B and described above. The dog leg 524*a* and aperture 524 can have perpendicular directional changes 574 and 576 at their ends. It is believed that the perpendicular directional changes 574 and 576 enhance the stress concentration ability of the isolated beam segments. Similar to that of FIG. 8*c* the perpendicular directional changes in the apertures function to smoothen the stress and resulting strain, therefore making these more uniform, in the direction perpendicular to the isolated beam segments.

Figure 9:
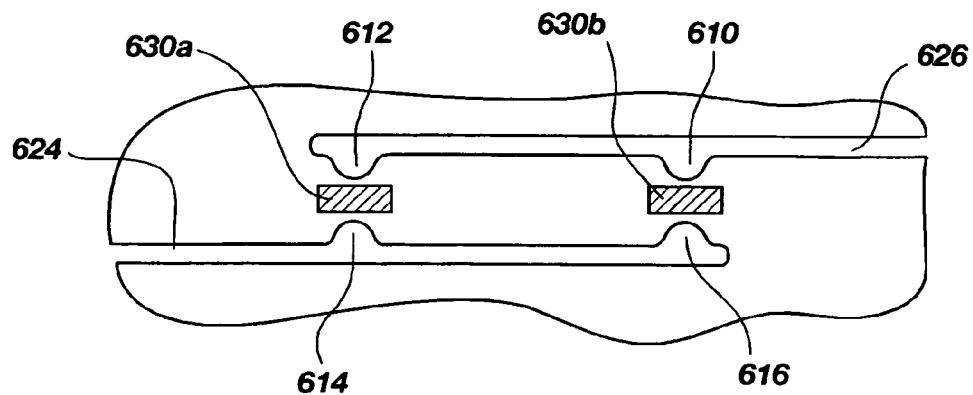
FIG. 9 illustrates a bottom view of a section of a force-based input device in accordance with another embodiment of the present invention.
Figure 10:
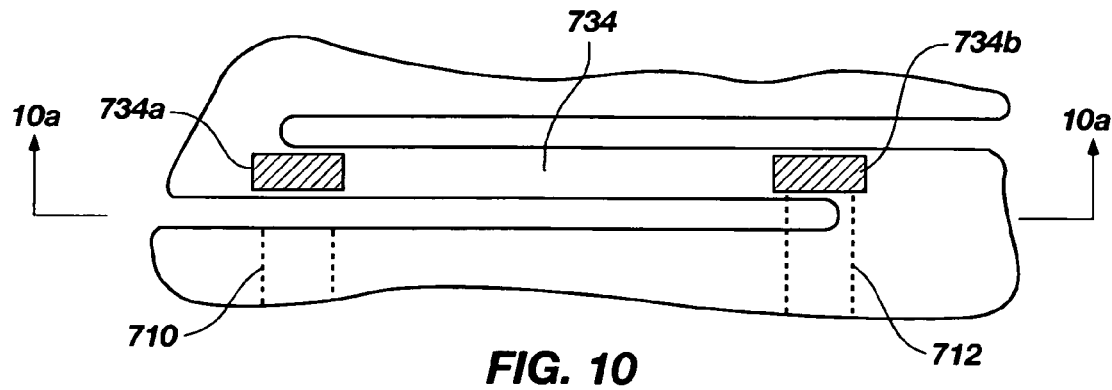
FIG. 10 illustrates a bottom and a side view of a section of a force-based input device in accordance with another embodiment of the present invention.
Figure 10A:
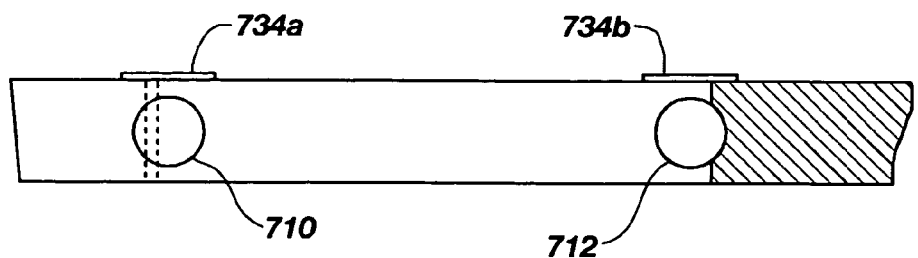
Figure 11:
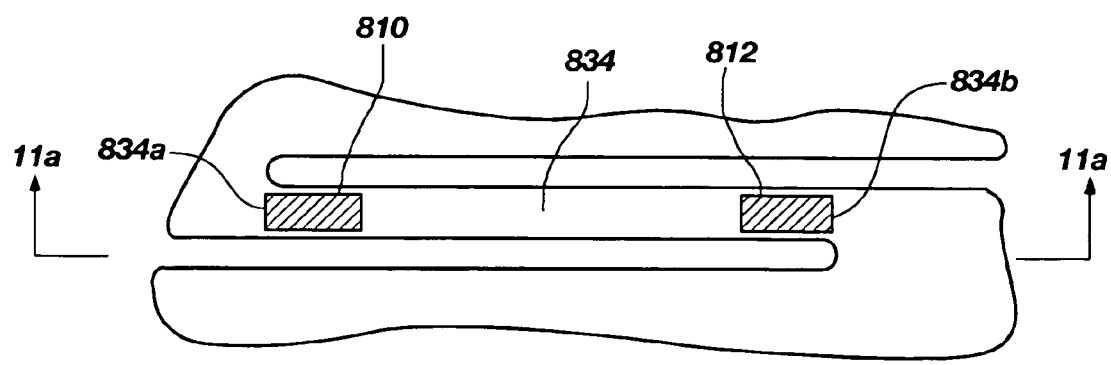
FIG. 11 illustrates a bottom and a side view of a section of a force-based input device in accordance with another embodiment of the present invention.
Figure 11A:
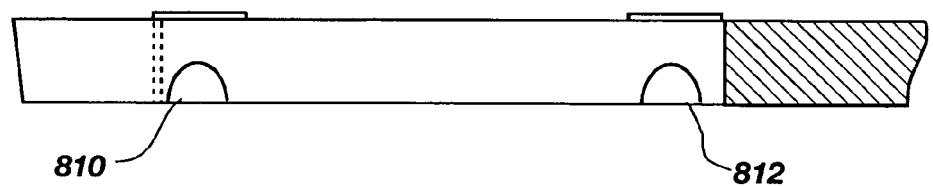

With reference to FIGS. 9-11, illustrated are several force-based input devices that incorporate various stress concentrating features with the isolated beam segments, which stress concentrating features may be used in combination with the several aperture configurations described herein. FIG. 9 illustrates notches 610, 612, 614, and 616 in the plurality of apertures 624 and 626 adjacent the location of the sensors. FIG. 10 illustrates holes 710 and 712 that are cut in the isolated beam segment 734 underneath the location of the sensors 734*a* and 734*b*. FIG. 11 illustrates notches 810 and 812 cut in the isolated beam segment 834 underneath the location of the sensors 834*a* and 834*b*.

Figure 12:
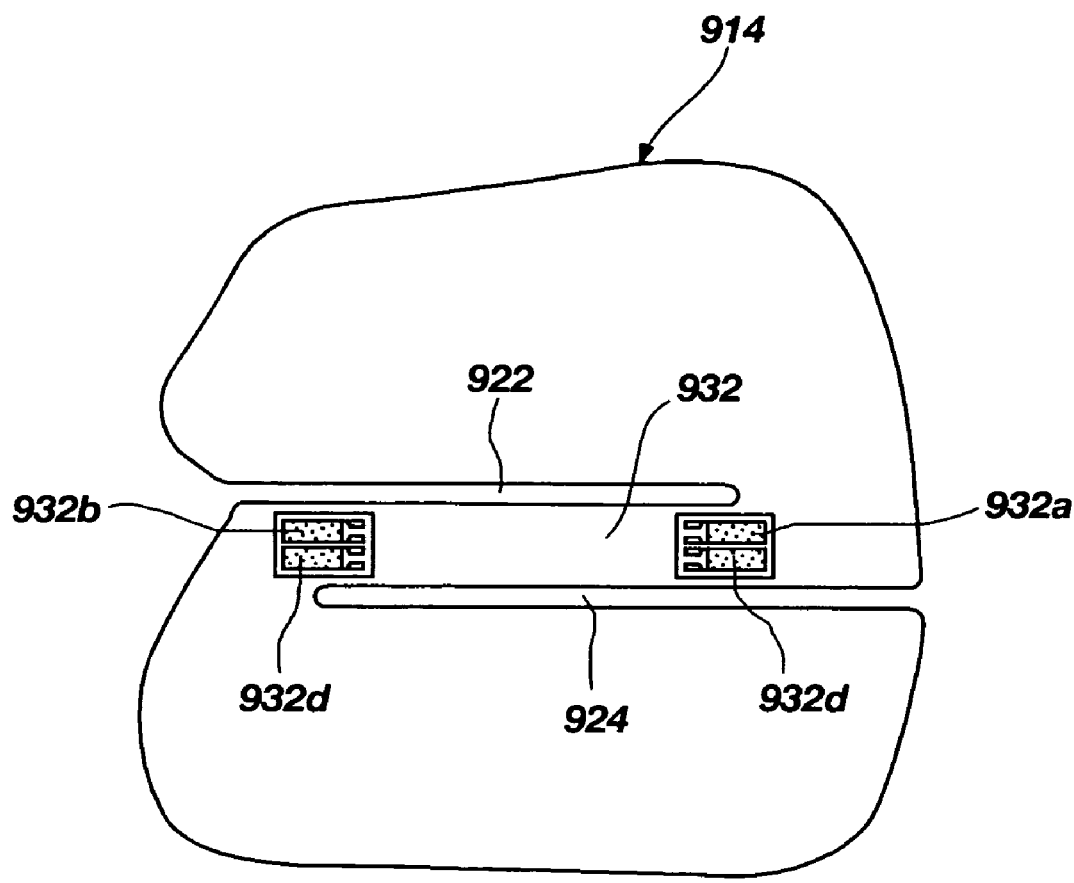
FIG. 12 illustrates a bottom view of a section force-based input device in accordance with another embodiment of the present invention.
Figure 12A:
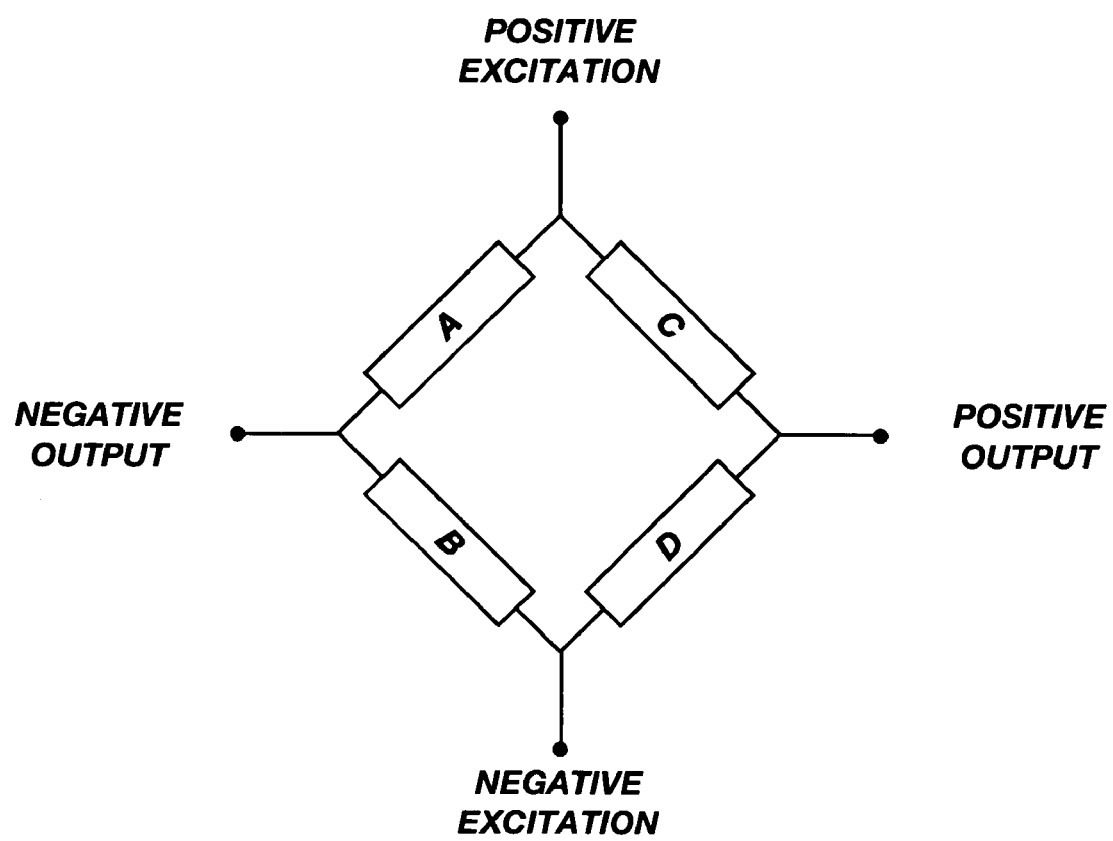

With reference to FIG. 12, illustrated is an isolated beam segment 932 formed in support base 914, which isolated beam segment 932 has associated with it four sensors that are operable to determine the location and magnitude of an applied force. The sensors are shown as strain gauges 932*a*, 932*b*, 932*c* and 932*d*, arrayed in a full bridge configuration (see FIG. 12-A), which is well known in the art for its advantages, such as for doubling the output, and others. This particular configuration of sensors functions to enhance the measurement accuracy of the sensors, collectively, in determining the location and magnitude of a force applied to the input pad.

Figure 13:
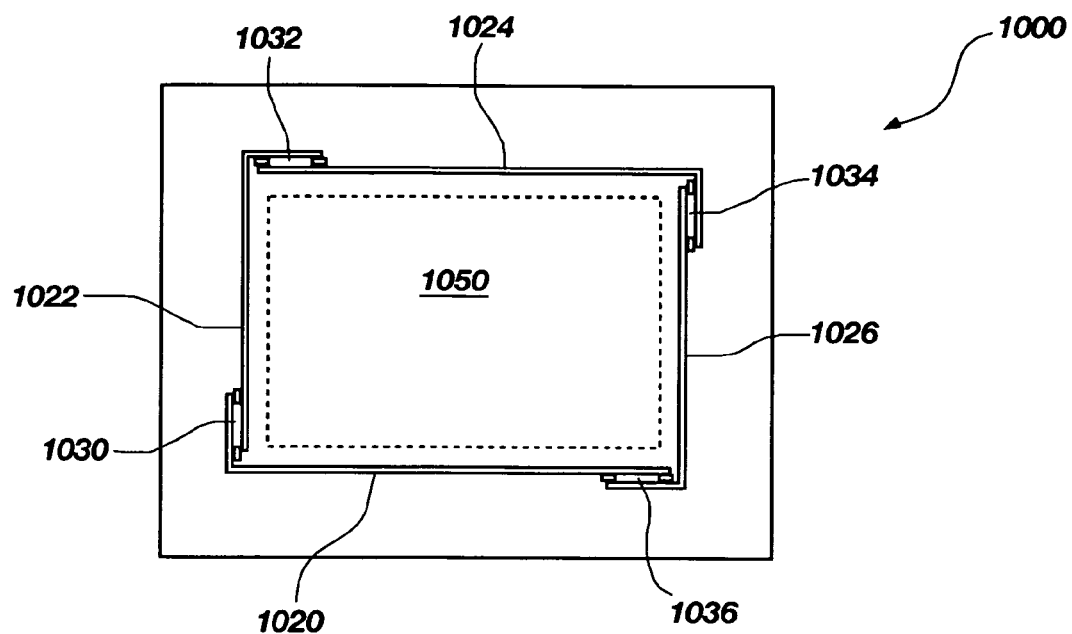
FIG. 13 illustrates a bottom view of a section force-based input device in accordance with another embodiment of the present invention.

With reference to FIG. 13, illustrated is a force-based input device 1000 including a plurality of apertures 1020, 1022, 1024, and 1026 that can define a rectangular input pad 1050 and isolated beam segments 1030, 1032, 1034 and 1036 near the corner of, and parallel to the sides of the input pad 1050. Aperture 1020 can extend along a side and around a corner of the input pad wherein the portion of the aperture that extends around the corner encloses a portion of aperture 1022. Aperture 1022 can extend along a side and around a corner of the input pad wherein the portion of the aperture that extends around the corner encloses a portion of aperture 1024. Aperture 1024 can extend along a side and around a corner of the input pad wherein the portion of the aperture that extends around the corner encloses a portion of aperture 1026. Aperture 1026 can extend along a side and around a corner of the input pad wherein the portion of the aperture that extends around the corner encloses a portion of aperture 1020. The plurality isolated beam segments 1030, 1032, 1034, and 1036 can be defined by the enclosed portion of the apertures.

Figure 13A:
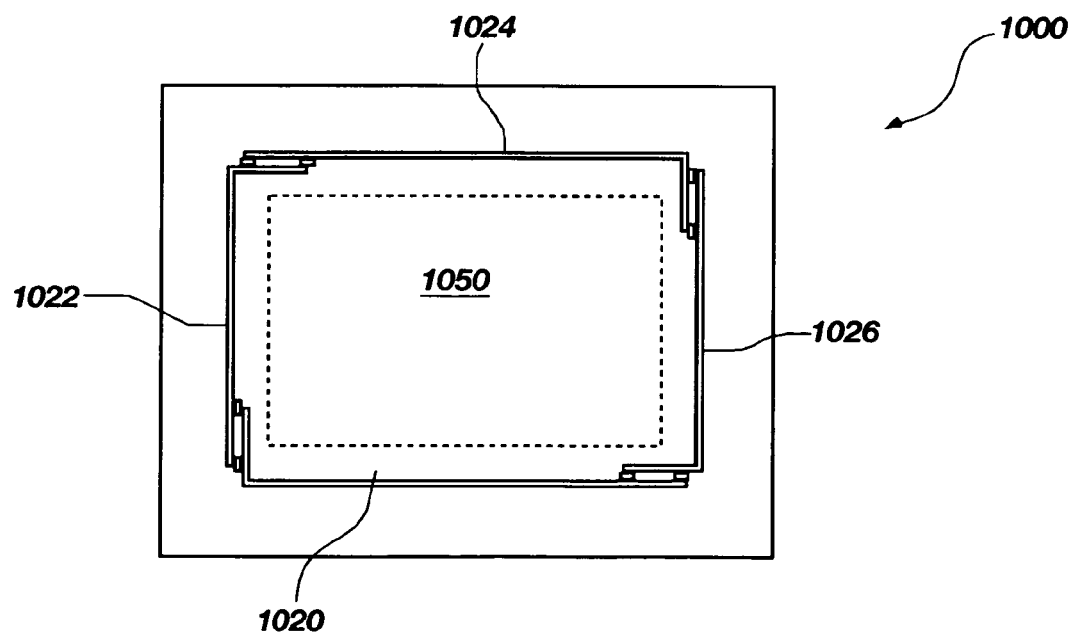
FIG. 13a illustrates a bottom view of a section force-based input device in accordance with another embodiment of the present invention.

Illustrated in FIG. 13*a* is an alternative embodiment of the input pad illustrated in FIG. 13 and described above. Aperture 1020 can extend along a side and around a corner of the input pad wherein the portion of the aperture that extends around the corner can be enclosed a portion of aperture 1022. Aperture 1022 can extend along a side and around a corner of the input pad wherein the portion of the aperture that extends around the corner can be enclosed a portion of aperture 1024. Aperture 1024 can extend along a side and around a corner of the input pad wherein the portion of the aperture that extends around the corner can be enclosed a portion of aperture 1026. Aperture 1026 can extend along a side and around a corner of the input pad wherein the portion of the aperture that extends around the corner can be enclosed a portion of aperture 1020.

Although the exemplary embodiments discussed above and shown in the drawings depict various exemplary force-based input devices having linear geometric configurations, it is contemplated that other exemplary force-based input devices may comprise nonlinear geometries, or a combination of these. It is further contemplated that the force-based input device may comprise virtually any arbitrary geometry. FIGS. 14-17 illustrate several different exemplary embodiments of force-based input devices having different geometric configurations. It is noted that these embodiments can be configured to function in a similar manner as other force-based input devices described elsewhere herein. As such, a detailed description of their geometry, and not their function, is provided.

Figure 14:
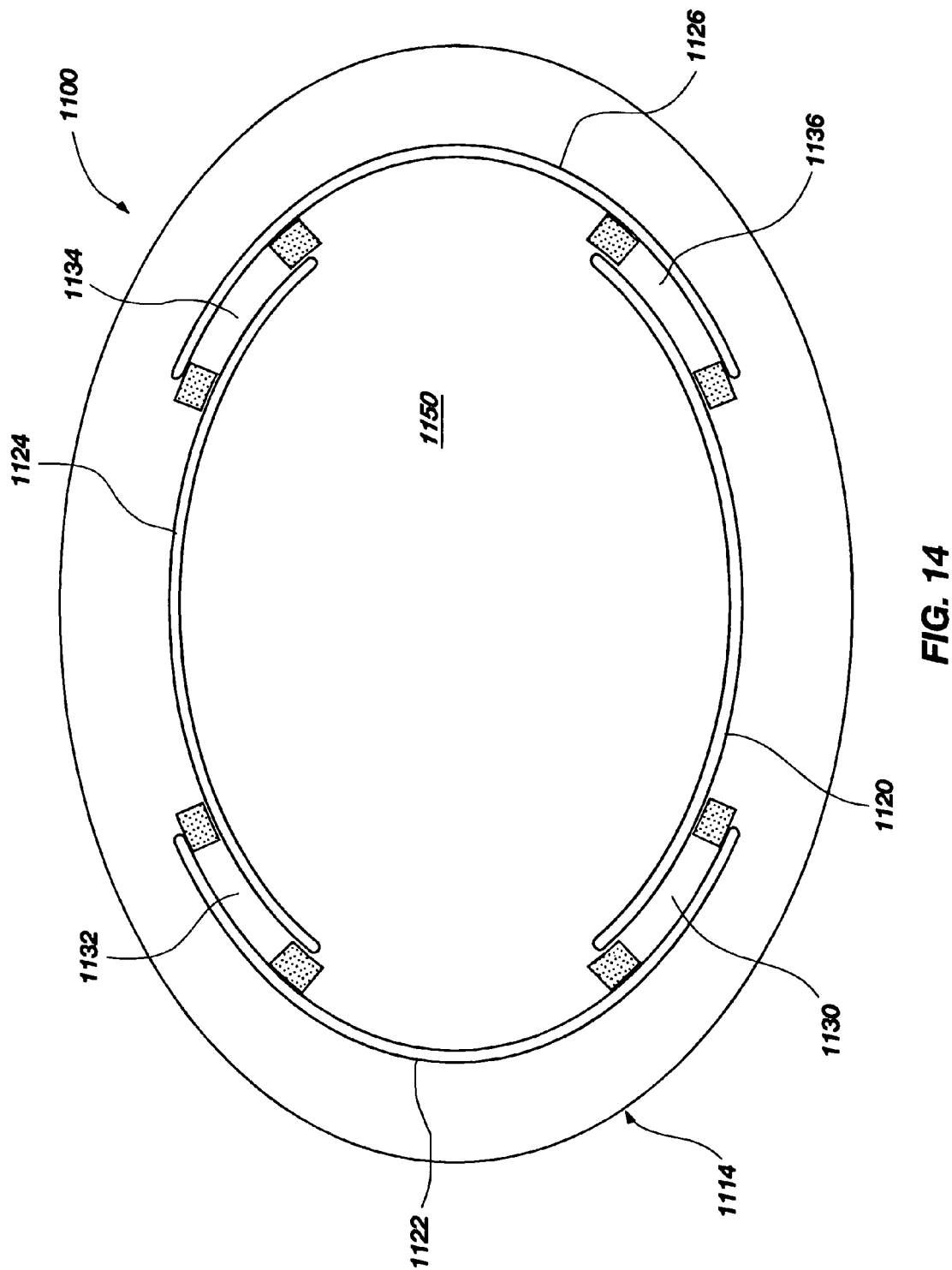
FIG. 14 illustrates a force-based input device in accordance with another embodiment of the present invention.

Specifically, FIG. 14 illustrates a force-based input device according to still another exemplary embodiment, which is similar in function to those discussed above. However, in this particular embodiment the force-based input device 1100 comprises a base support 1114 having a nonlinear geometric configuration in the shape of an oval. In addition, curved apertures 1120, 1122, 1124, and 1126 are formed in the base support 1114, which apertures function to define a plurality of isolated beam segments, shown as beam segments 1130, 1132, 1134, and 1136, as well as an input pad 1150. The force based input device 1100 further comprises a plurality of sensors operable with each isolated beam segment. The curved apertures are configured to be parallel with a perimeter or periphery of the base support. However, this is not required. The apertures may be formed at any orientation with respect to the periphery of the base support. In addition, the apertures may comprise any type of spline configuration.

Figure 15:
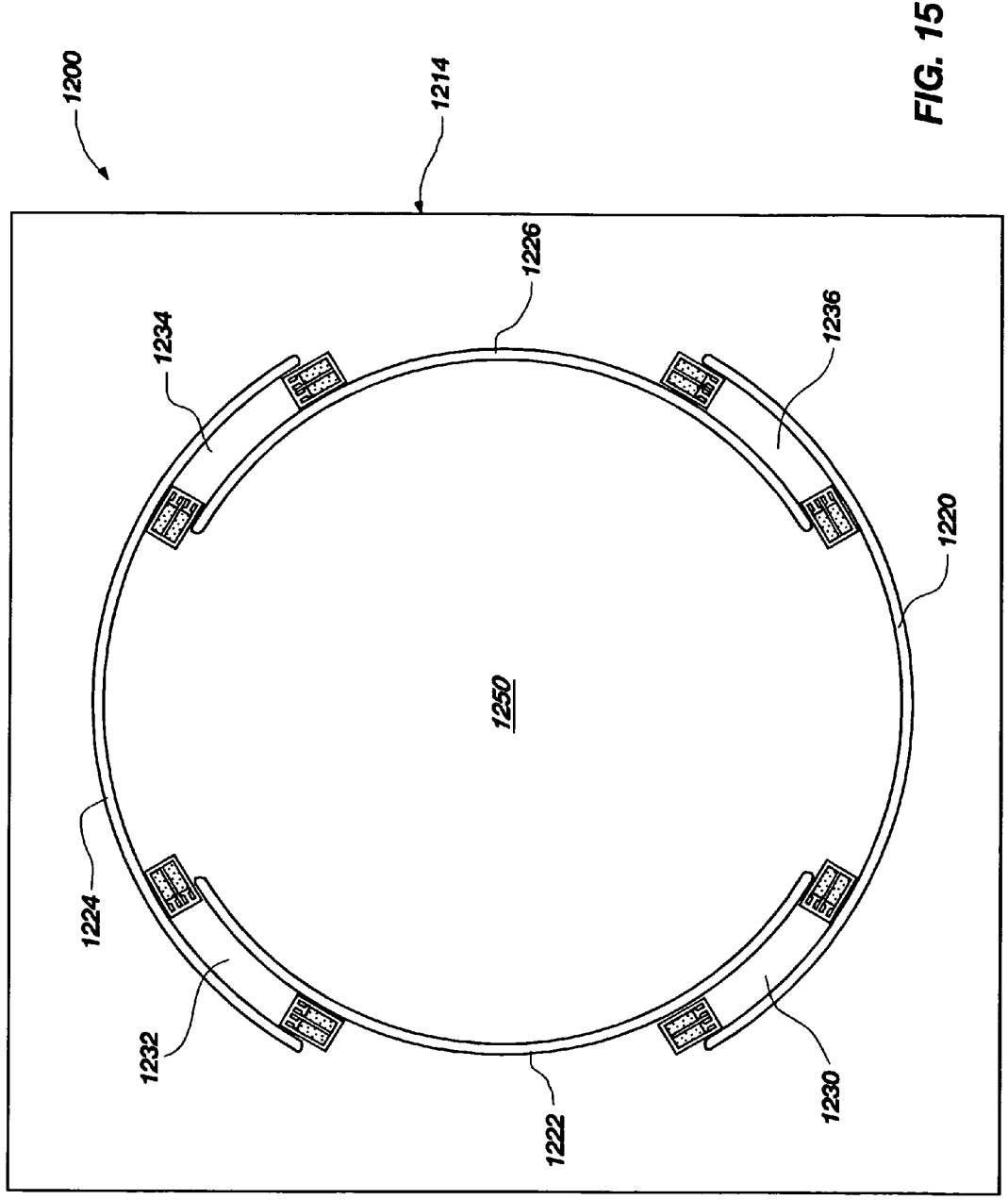
FIG. 15 illustrates a force-based input device in accordance with another embodiment of the present invention.

FIG. 15 illustrates a force-based input device according to still another exemplary embodiment, which, again, is similar in function to those discussed above. However, in this particular embodiment the force-based input device 1200 comprises a base support 1214 having a linear geometric configuration in the shape of a square. In addition, curved apertures 1220, 1222, 1224, and 1226 are formed in the base support 1214, which apertures function to define a plurality of isolated beam segments, shown as beam segments 1230, 1232, 1234, and 1236, as well as a substantially circular input pad 1250. The force based input device 1200 further comprises a plurality of sensors operable with each isolated beam segment.

Figure 16:
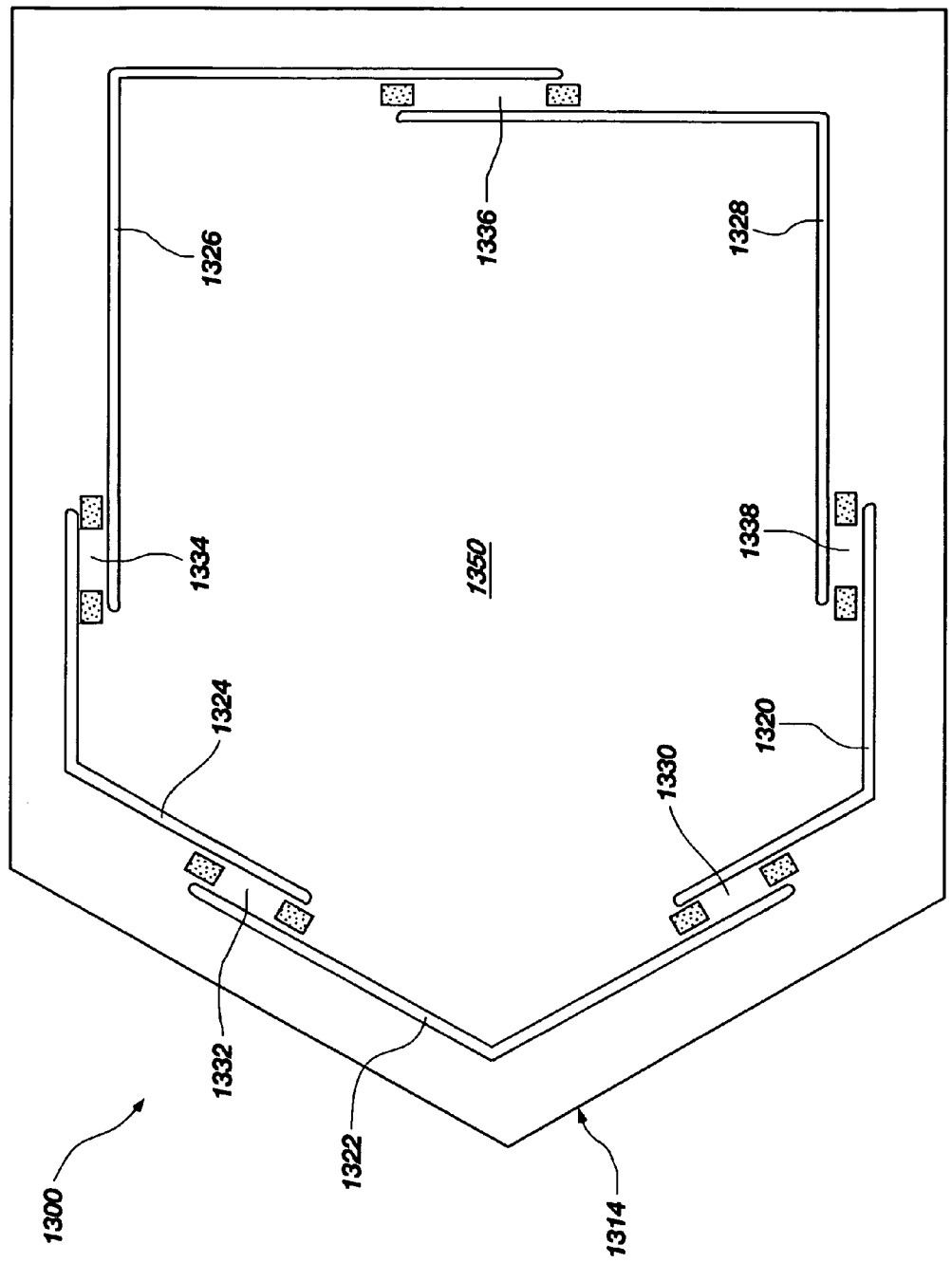
FIG. 16 illustrates a force-based input device in accordance with another embodiment of the present invention.

FIG. 16 illustrates a force-based input device according to still another exemplary embodiment, which, again, is similar in function to those discussed above. However, in this particular embodiment the force-based input device 1300 comprises a base support 1314 having a linear geometric configuration in the shape of a pentagon. In addition, linear apertures 1320, 1322, 1324, 1326, and 1328 are formed in the base support 1314, which apertures function to define a plurality of isolated beam segments, shown as beam segments 1330, 1332, 1334, 1336, and 1338, as well as an input pad 1350 having a substantially pentagonal geometry. The force-based input device 1300 further comprises a plurality of sensors operable with each isolated beam segment. The plurality of apertures are formed or configured to be parallel to the periphery of the base support.

Figure 17:
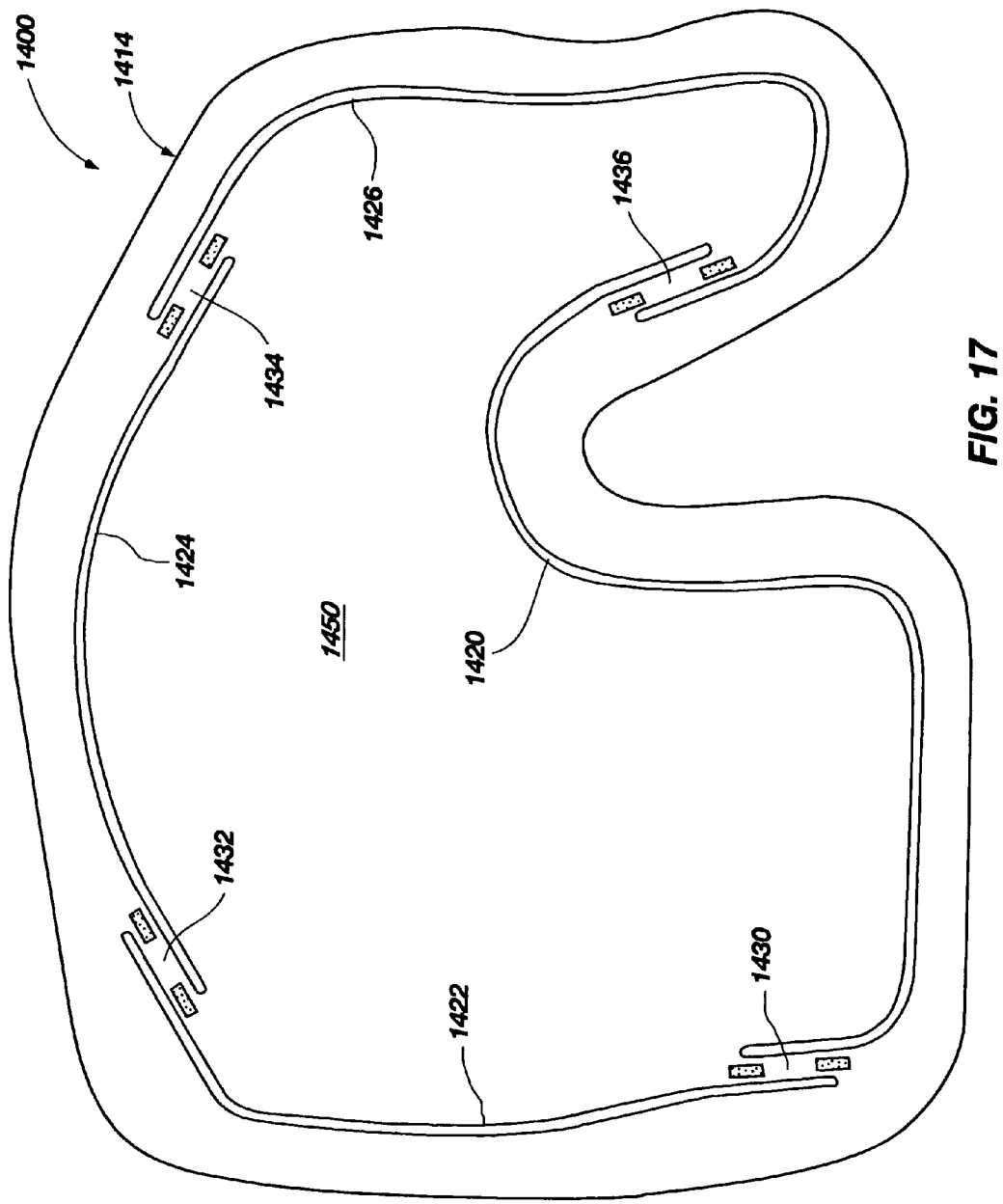
FIG. 17 illustrates a force-based input device in accordance with another embodiment of the present invention.

FIG. 17 illustrates a force-based input device according to still another exemplary embodiment, which, again, is similar in function to those discussed above. However, in this particular embodiment the force-based input device 1400 comprises a base support 1414 having an arbitrary shape. In addition, apertures 1430, 1432, 1434, and 1436 are formed in the base support 1414, which apertures function to define and plurality of isolated beam segments, shown as beam segments 1430, 1432, 1434, and 1436, as well as an arbitrarily-shaped input pad 1450. The force-based input device 1400 further comprises a plurality of sensors operable with each isolated beam segment. This embodiment illustrates how the support base and the apertures formed therein may comprise any arbitrary, spline configuration or geometry.

Figure 18:
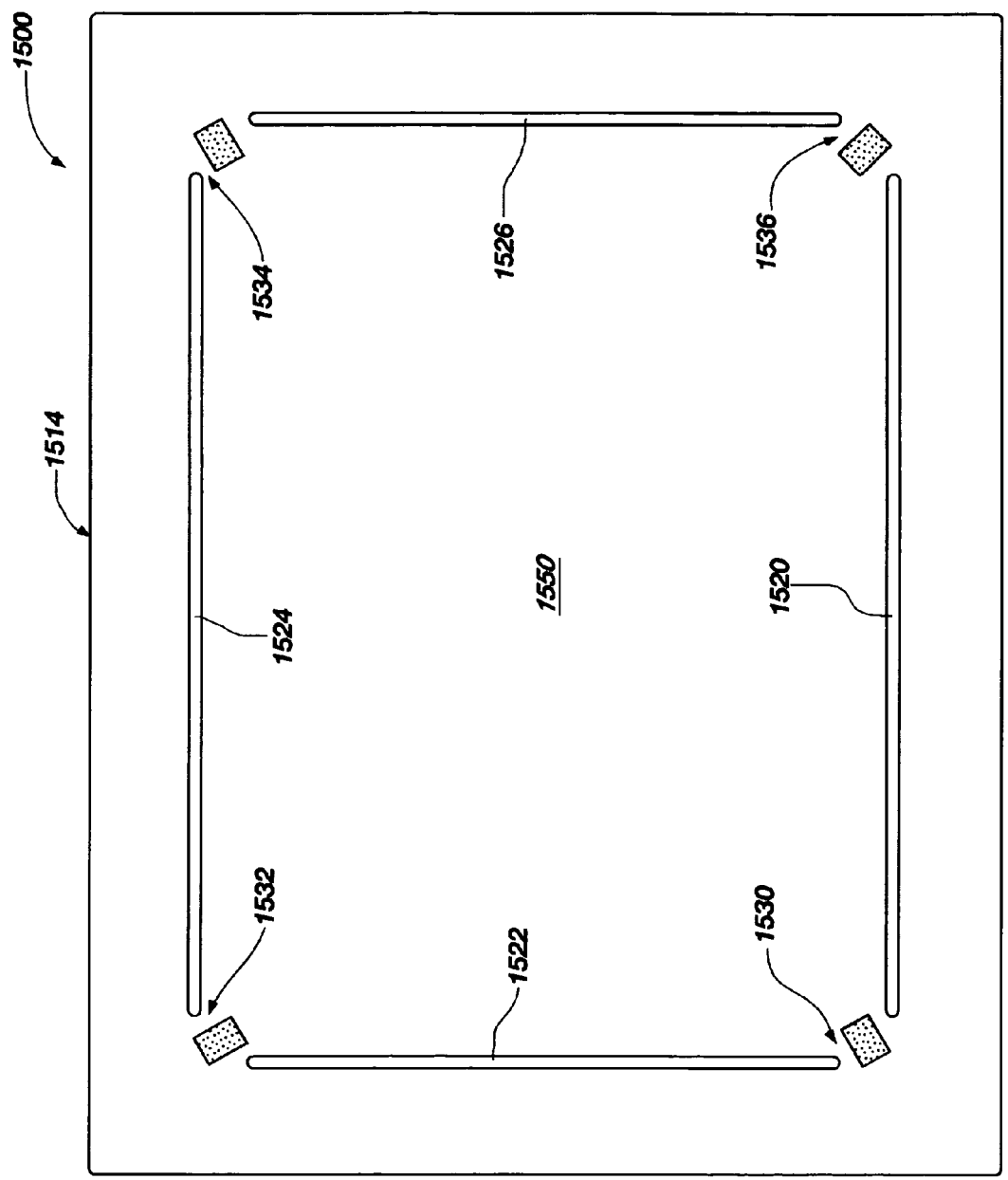
FIG. 18 illustrates a force-based input device in accordance with another embodiment of the present invention.
Figure 19:
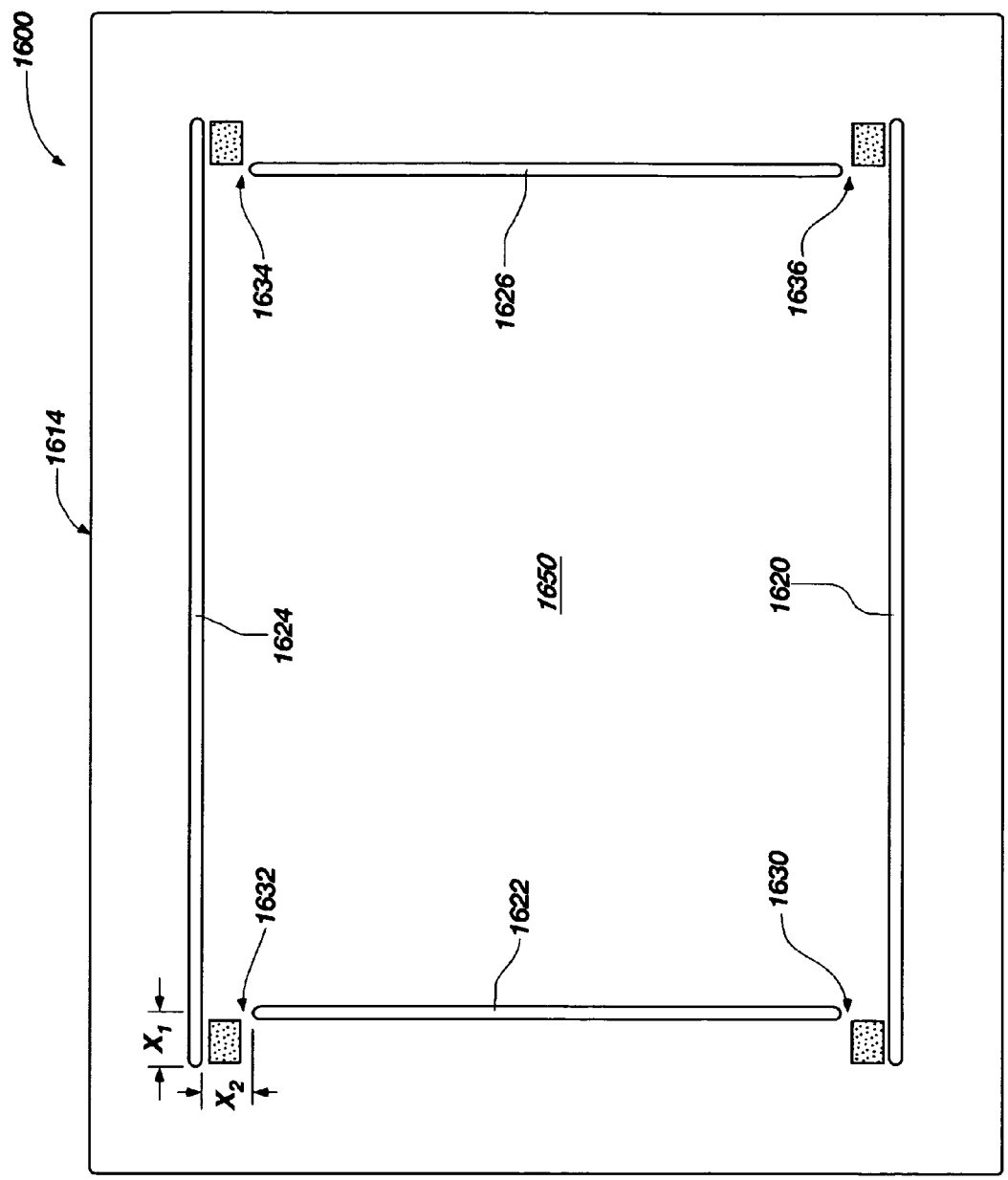
FIG. 19 illustrates a force-based input device in accordance with another embodiment of the present invention.
Figure 20:
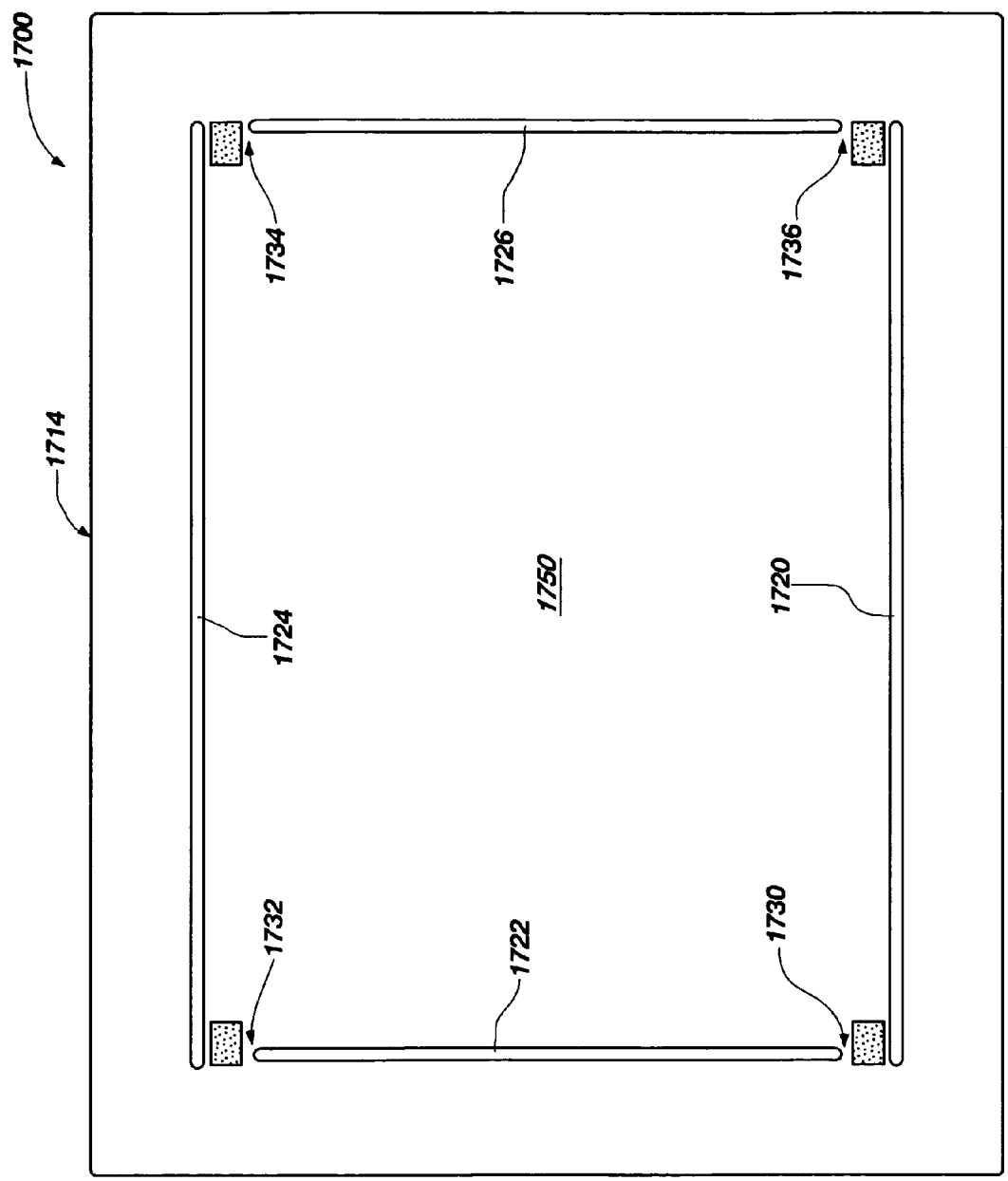
FIG. 20 illustrates a force-based input device in accordance with another embodiment of the present invention.

FIGS. 18-20 illustrate several force-based input devices in accordance with still other exemplary embodiments of the present invention. As shown in these figures, the apertures formed within the base supports are not configured to overlap or extend beyond one another to form or define the isolated beam segments as in the other force-based input devices discussed above. Rather, the isolated beam segments are each formed or defined by two terminal ends of two different apertures and the approximation of these ends to one another. As such, the isolated beam segments defined by the apertures are much shorter in length.

FIG. 18 illustrates an force-based input device 1500 having a support base 1514 and a plurality of apertures formed therein, shown as apertures 1520, 1522, 1524, and 1526. These apertures function similar to those described elsewhere herein, namely to define a plurality of isolated beam segments, shown as isolated beam segments 1530, 1532, 1534, and 1536, as well as to define an input pad 1550. The apertures are configured such that each of their opposing terminal end is in close proximity with a terminal end of another aperture. However, unlike the other exemplary force-based input devices described above, none of the apertures are configured so that a segment of that aperture overlaps a segment of another aperture in a parallel manner. As such, the isolated beam segments are not formed by these overlapping segments. Instead, the isolated beam segments of the force-based input device 1500 are defined by the terminating ends of two apertures. Since these terminating ends are configured to be in close proximity to one another, the isolated beam segments are defined by that portion of the support base extending between the terminal ends of the two apertures. The isolated beam segments formed in this manner are shorter in length than would otherwise be in the case of overlapping aperture segments as their length is approximately that of the width of the apertures. In the specific embodiment shown in FIG. 18, the ends of each aperture terminate prior to joining the adjacent aperture, thus creating an isolated beam segment. One or more sensors may be located within or about the formed beam segment, which sensors are intended to function in a similar manner as described above.

FIG. 19 illustrates a similar configuration, except the force-based input device 1600 comprises horizontal apertures 1620 and 1624, formed in support base 1614, having ends that extend beyond the vertical location vertical apertures 1622 and 1626 a distance $x_1$. Furthermore, vertical apertures 1622 and 1626 comprise ends that terminate prior to intersecting or joining the horizontal apertures 1620 and 1624, which termination results in a gap having a distance $x_2$. Again, the apertures, and particularly their ends being in close proximity to one another function to define a plurality of isolated beam segments, shown as isolated beam segments 1630, 1632, 1634, and 1636. In addition, located within or about the isolated beam segments is one or more sensors configured to be operable with the isolated beam segments as discussed herein. Again, the apertures are also configured to define the isolated beam segments, as well as the input pad 1650.

FIG. 20 illustrates an exemplary force-based input device 1700 similar to the one described above and shown in FIG. 19, except that the ends of the horizontal apertures 1720 and 1724, formed in support base 1714, do not extend beyond the vertical location of the vertical apertures 1722 and 1726. Instead, the ends of the horizontal apertures terminate at the vertical location of the vertical apertures. A gap or distance $x_2$ is still maintained as the vertical apertures do not intersect or join the horizontal apertures, which gap or distance represents the isolated beam segments, shown as isolated beam segments 1730, 1732, 1734, and 1736, each of which are operable with one or more sensors as located thereon or thereabout. The various apertures also define the input pad 1750.

Figure 21:
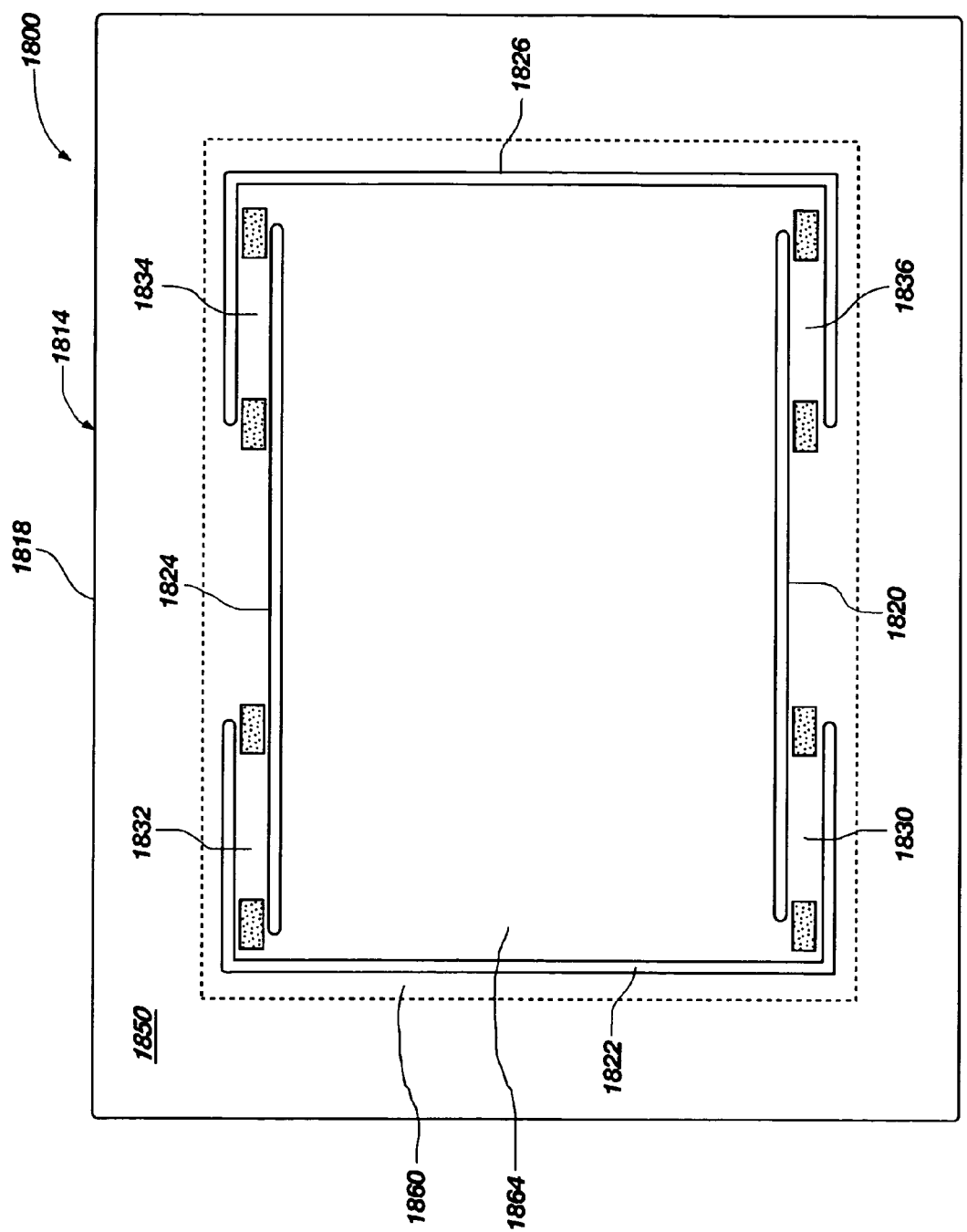
FIG. 21 illustrates a bottom view of a force-based input device in accordance with still another embodiment of the present invention, in which the input pad is configured about the perimeter of the support base.

FIG. 21 illustrates a force-based input device 1800 in accordance with still another exemplary embodiment of the present invention. In this particular embodiment, the input device 1800 can have a base support 1814 having an outer periphery 1818. A plurality of apertures 1820, 1822, 1824, and 1826 can be formed in the base support 1814 within the periphery 1818. The apertures 1820, 1822, 1824, and 1826 can be located along the periphery 1818 and can define a substantially rectangular input pad 1850 formed about the periphery 1818, as delineated by dashed lines in FIG. 21. The plurality of apertures can also define a plurality of isolated beam segments, 1830, 1832, 1834, and 1836, near the corners of, and parallel to the sides of the input pad 1850, each of which may be operable with one or more sensors as shown.

The base support 1814 is shown comprising a substantially flat, or planar, pad or plate. The base support 1814 can have an outer mounting surface 1860 and an inner mounting surface 1864 that can lie essentially within the same plane in a static condition. The outer mounting surface 1860 can be located between the periphery 1818 and the apertures 1820, 1822, 1824, and 1826, as well as between the input pad 1850 and the various apertures. In other words, the input pad 1850 may be configured to circumscribe the outer mounting surface 1860. The inner mounting surface 1864 can be located inside of, or in other words circumscribed by, the various apertures. The isolated beam segments 1830, 1832, 1834, and 1836 can connect the inner mounting surface 1864 with the outer mounting surface 1860. The outer mounting surface 1860 can be mounted to any suitably stationary mounting structure configured to support the input device 1810. The input pad 1850 can be a separate structure mounted to the outer mounting surface 1860, or it may be configured to be an integral component that is formed integrally with the outer mounting surface 1860.

The input pad 1850, as supported about and integral with the periphery 1818 is configured to displace in response to various stresses induced in the input pad 1850 resulting from application of a force acting on the input pad 1850. The input pad 1850 is further configured to transmit the stresses induced by the applied force to the outer mounting surface 1860 and eventually to the isolated beam segments 1830, 1832, 1834, and 1836 where resulting strains in the isolated beam segments are induced and measured by the one or more sensors.

Essentially, the input device embodiment illustrated in FIG. 21 is similar to that shown in FIG. 1, except that the input pad of FIG. 21 is located about the perimeter or periphery of the input device with the inner and outer mounting surfaces being positioned inside or interior to the input pad. In other words, the input device of FIG. 21 may be considered to comprise a structural configuration that is the inverse of the input device shown in FIG. 1. This particular embodiment is intended to illustrate that the present invention broadly contemplates a first structural element supported in a fixed position, and a second structural element operable with the first structural element, wherein the second structural element is dynamically supported to be movable with respect to the first structural element to define an input pad configured to displace under an applied force.

A method for making a force-based input device includes providing a base support capable of receiving an applied force. Apertures can be formed through the base support to define a input pad, and a plurality of isolated beam segments. The isolated beam segments can receive resultant forces transmitted the input pad when the input pad is displaced by an applied load. At least two sensors can be attached to each of the isolated beam segments to measure the forces transmitted from the input pad to the periphery. The sensors can output a signal corresponding to the applied force that can be used to determine the location and magnitude of the force applied to the input pad by means and methods known in the art.

A method for determining the location and magnitude of a force on a touch pad can include providing a base support having a periphery and a plurality of apertures that define a input pad. The input pad can be displaced by applying a force to the input pad. The force applied to the input pad can be transmitted by the input pad to a plurality of isolated beam segments, formed by the plurality of apertures. The isolated beam segments can be configured to receive resultant forces transmitted to the isolated beam segments by the displacement of the input pad. The transmitted forces can be measured by at least two sensors, located along each of the isolated beam segments. The sensors can be configured to output a signal corresponding to the applied force. The signal can be used to determine the location and magnitude of the force applied to the input pad by various processing means and methods, such as those known in the art.

As indicated above, the present invention features one or more processing means configured to process the signal output from the various sensors for one or more purposes, such as to determine the coordinates of the force being applied to the force-based touch pad, or to improve accuracy readings by accounting for and correcting changes in baseline activity. For example, the force signal sample from the sensors can be averaged from the beginning of the touch until either a specified time elapses or the force waveform crosses zero, at which time the location can be calculated. Other methods for determining the touch coordinates can include mapping the total force signal by a weighting function and integrating from the beginning of the touch to the end of the touch, waiting for the total force to exceed a specified threshold, averaging or integrating the sensor signal between specified points either of force level or time, estimating the peak of the total applied force, or pre-determining the preferred time of measurement.

Figure 22:
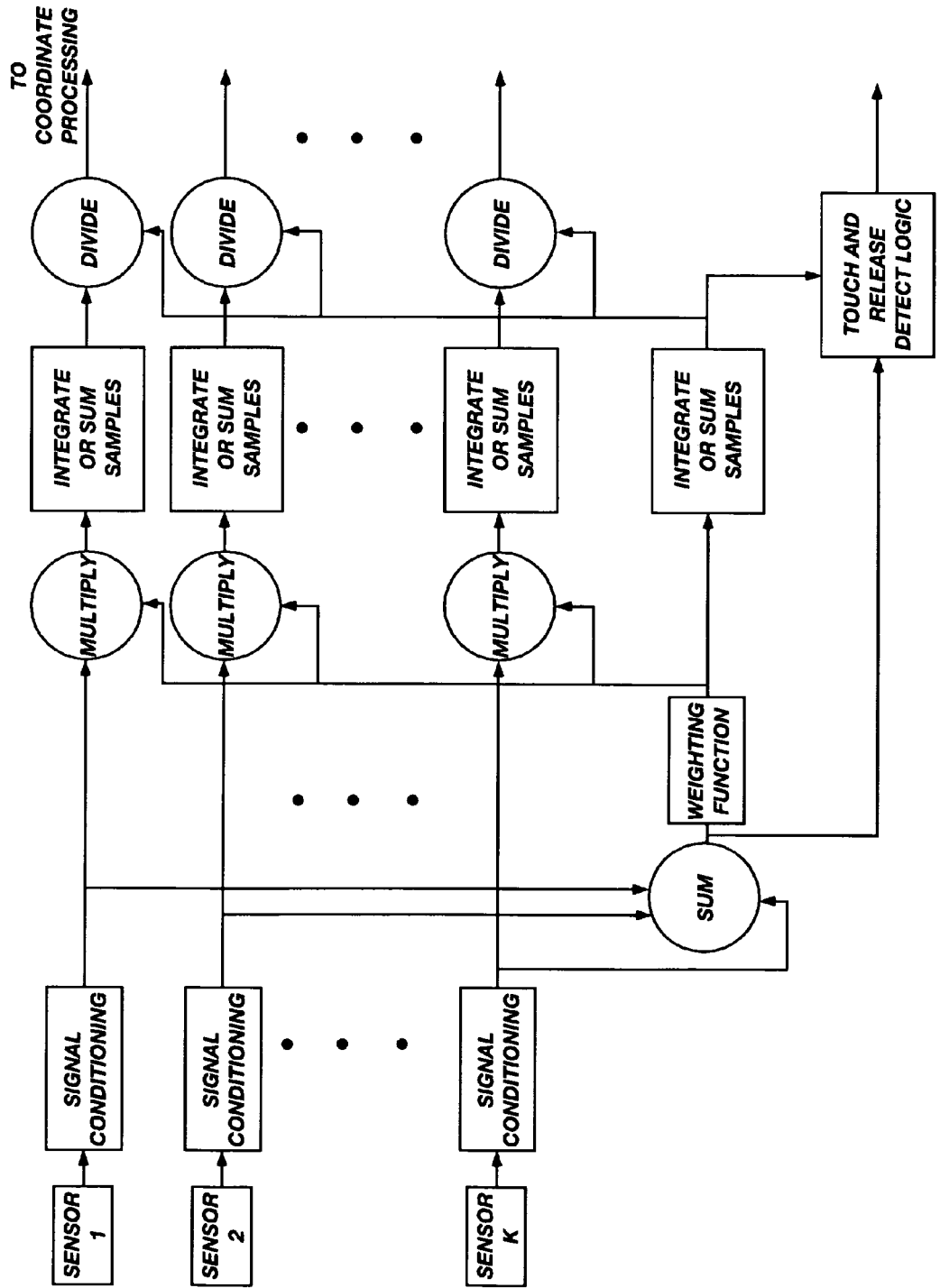
FIG. 22 illustrates a block diagram of a processing method used to determine at least one of the location and/or magnitude of an applied force on the input pad, according to one exemplary embodiment.
Figure 23:
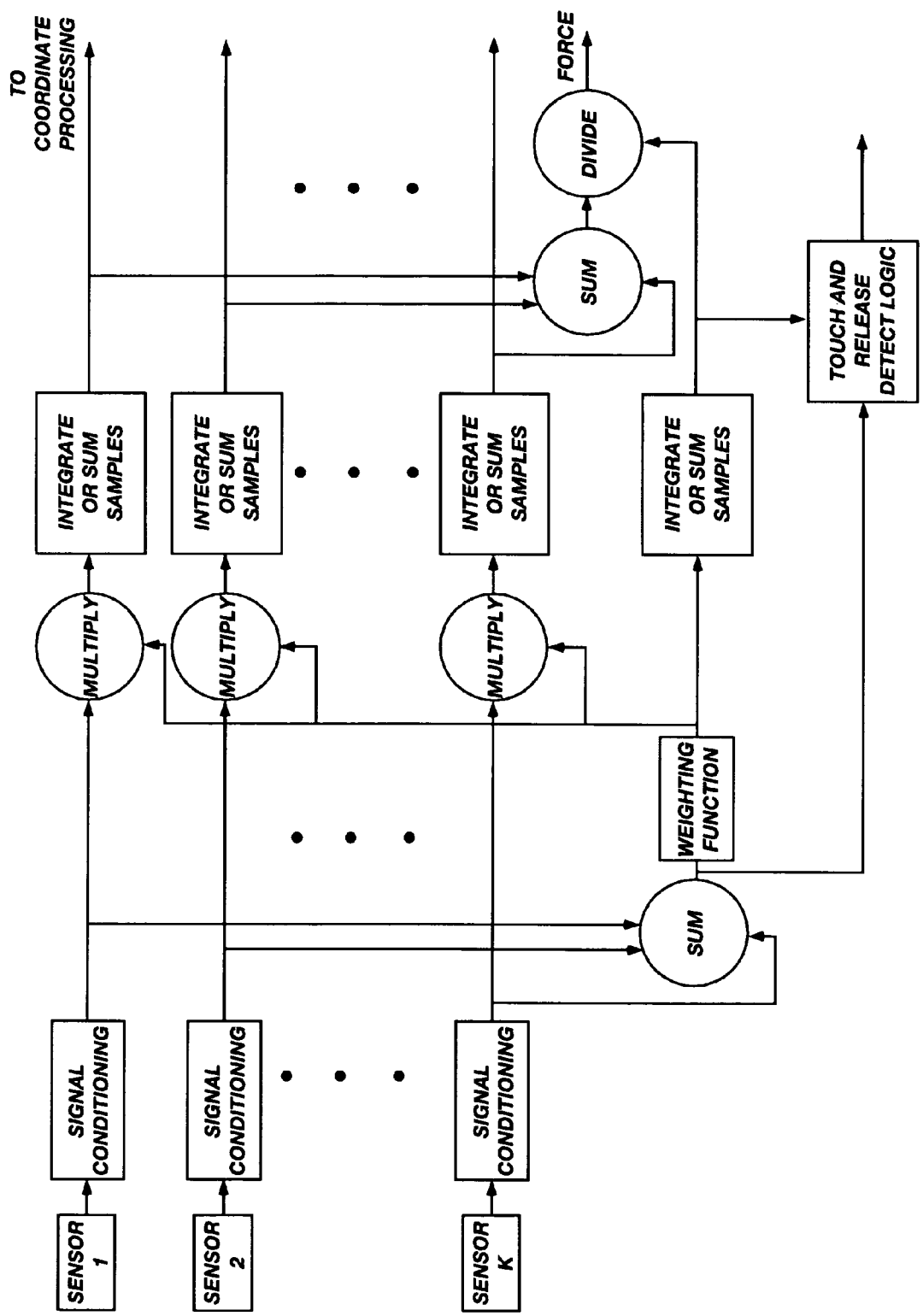
FIG. 23 illustrates a block diagram of a processing method according to another exemplary embodiment.
Figure 24:
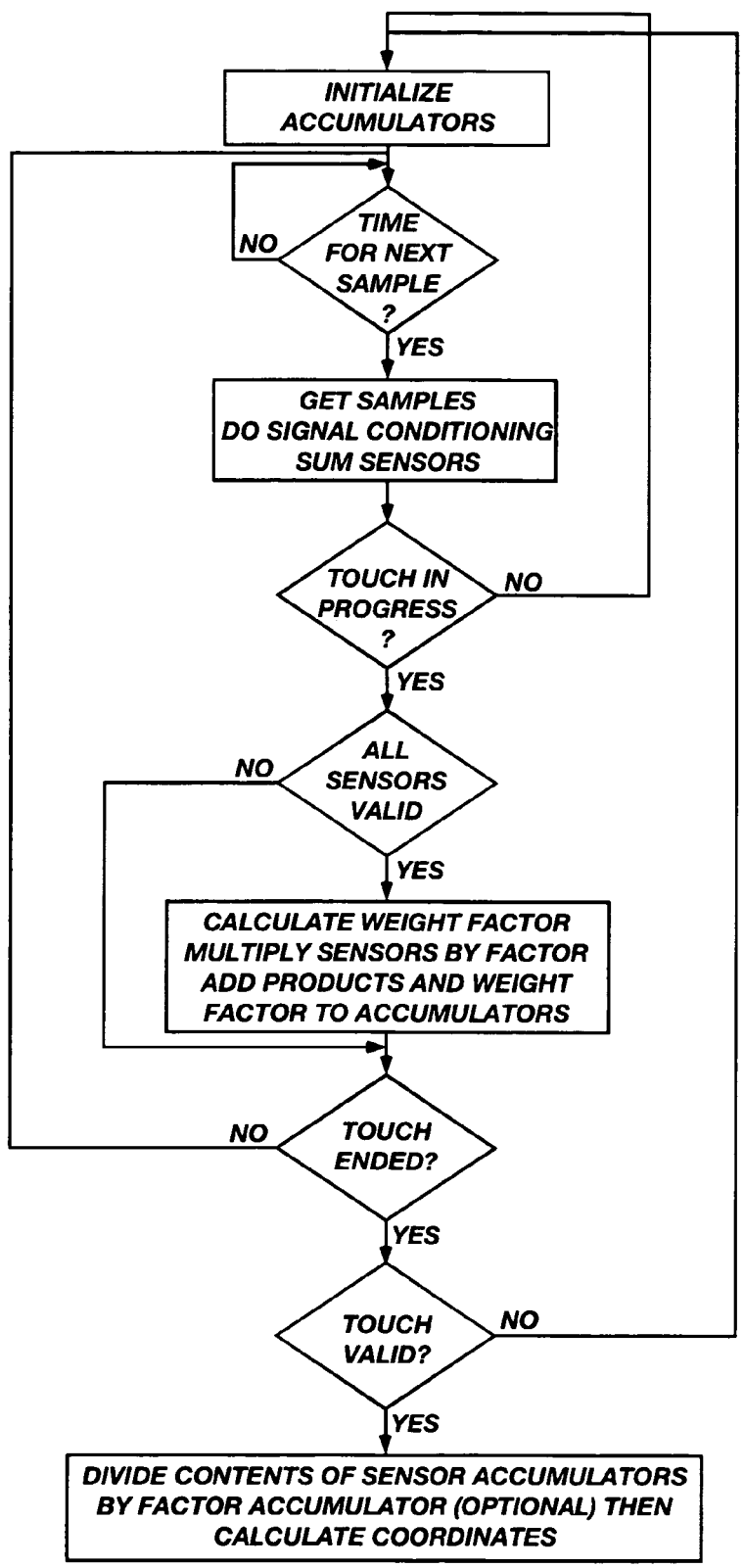
FIG. 24 illustrates a flow diagram depicting a method for determining the coordinates of a force acting on a force-based touch pad according to one exemplary embodiment.

With reference to FIGS. 22-24, illustrated are various block and flow diagrams of a signal processing method according to one exemplary embodiment. Specifically, with reference to FIG. 22, the sensor signals are first conditioned to correct the baseline, calibrate the sensor, equalize the time response, filter the noise, and correct for sampling time errors. The conditioned signals from all of the sensors are then summed to form the total force signal. The total force signal is then mapped into the time domain by a weighting function. Each conditional signal is then multiplied by the weighting factor and the weighted signals are then integrated beginning at the start of the touch until the end of the touch. The results are then used to calculate the location and magnitude of the applied force.

FIG. 23 is similar to that shown in FIG. 22, only here, the processing method takes into account that most methods of calculating the spatial touch coordinates are insensitive to the scale factor of the sensor signals. As such, dividing by the integral of the weighting factor is eliminated. Instead the signals are summed before being divided.

FIG. 24 illustrates an exemplary method for implementing the process described above to measure the applied force. The sensor channels are sampled at regular intervals and after one sample from each sensor is obtained, the sensors are calibrated, corrected, filtered and equalized. The sum of the sensors is then calculated. If a touch in process is valid, and if all sensors are valid, the weighting factor is calculated from the sum of the sensors. The product of the weighting factor and the sensor value is added to each sensor signal input. The weighting factor is also added to the sensors input signal. When the touch has ended, the processor checks for acceptable accuracy of the measurement, divides by the weighting factor, and further processes the signals to calculate the location or coordinates and magnitude of the applied force.

Exemplary techniques for processing signals from the sensors are also disclosed in commonly owned U.S. patent application Ser. No. 11/402,985, U.S. Publication No. US-2006-0284856-A1) entitled "Sensor Signal Conditioning in a Force-Based Input Device," and U.S. patent application Ser. No. 11/402,692, (now U.S. Pat. No. 7,337,085) entitled "Sensor Baseline Compensation in a Force-Based Touch Device," each filed the same day as the present application and incorporated herein by reference.

Indeed, other processing means and methods may be employed by the present invention that are known to those skilled in the art. For example, U.S. Pat. No. 4,121,049 to Rober; and U.S. Pat. No. 4,340,772 to DeCosta et al. disclose and discuss exemplary processing methods that may be incorporated for use with the present invention. As such, the present invention should not be limited to any particular processing means or methods, as each of these is contemplated for use and may be implemented with the force-based touch pad of the present invention to perform its intended function of processing the signal(s) received from the various sensors for one or more purposes.

Figure 25:
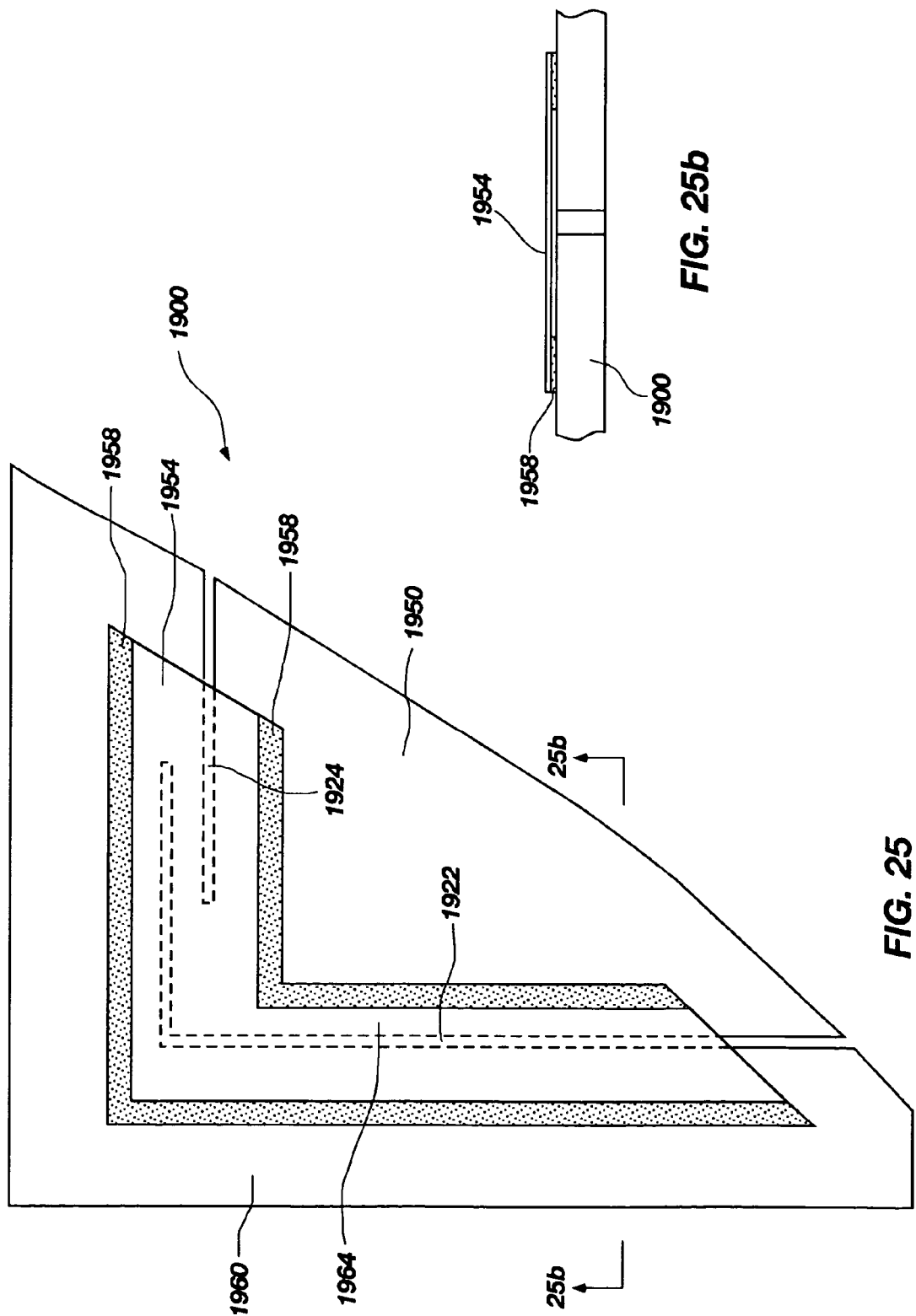
FIG. 25 illustrates a top view of a portion of a touch pad, wherein the touch pad comprises sealing means designed to protect the touch pad from foreign objects and other debris.

With reference to FIGS. 25 and 25b, illustrated are respective top and side cross-sectional views of a portion of a touch pad, wherein the touch pad comprises sealing means designed to protect the touch pad from foreign objects and other debris so that moisture, dust and so forth can not pass through the apertures, if they completely penetrate the screen. As shown, the touch pad 1900 comprises a flexible membrane 1950 attached to the inner and outer frame areas, shown as outer mounting surface 1160 and inner mounting surface 1964 adjacent the input pad 1950, to cover or seal apertures 1922 and 1924. The flexible membrane 1954 may be attached using an adhesive, such as adhesive 1958, or any other suitable attachment means. Flexible membrane 1954 is intended to be exemplary only of a single type of sealing means. Indeed, other types of sealing means may be used to seal the touch pad 1900, which are contemplated herein.

Figure 26:
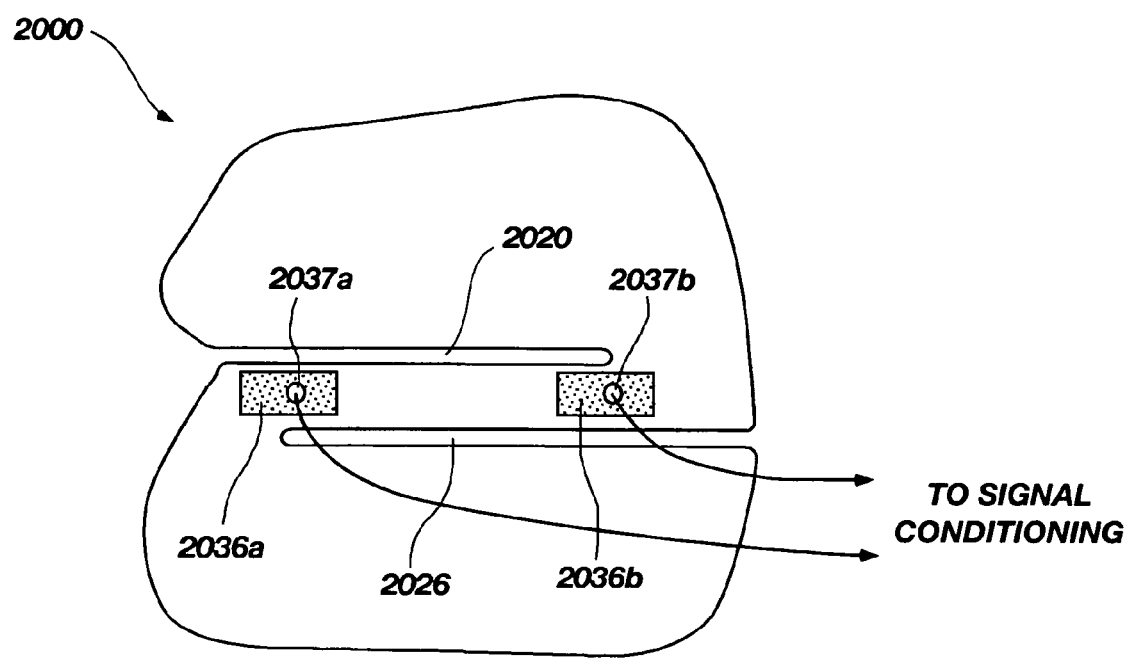
FIG. 26 illustrates a force-based touch pad utilizing piezo-electric sensors according to one exemplary embodiment of the present invention.

FIG. 26 illustrates an alternative embodiment of a force-based touch pad 2000, wherein piezoelectric sensors, more accurately transducers, are utilized in place of stain gauge sensors. In one exemplary configuration, piezoelectric transducers 2036a and 2036b may be mounted so that they are electrically in series with one another. This mounting configuration, however, only works with electrically conductive substrates. As such, the force-based touch pad 2000 comprises an electrically conductive substrate. The piezoelectric transducers 2036 each comprise metallic electrodes (not shown) located on their top and bottom surfaces. FIG. 36 illustrates electrical connectors 2037-a and 2037-b (e.g., solder or other material deposits) located on respective bottom surfaces of the piezoelectric transducers 2036-a and 2036-b. The bottom surfaces are configured to be in electrical contact with the substrate. The output connections are made at the top surfaces (not shown) of the transducers 2036a and 2036b.

The advantage of locating the electrodes on the top and bottom surfaces of the transducers parallel to the plane of the isolated beam segments is that this orientation is most sensitive to strain parallel to the base support. Most prior related force-based touch pads use piezoelectric sensors to measure force perpendicular to the electrode planes. This, however, makes the sensors sensitive to lateral forces. As a result, many of the prior related force-based touch pads use elaborate schemes to reduce the lateral forces applied to the sensors. In the present invention, there are no forces being applied in the perpendicular direction. Indeed, the transducers are configured to measure strain which occurs parallel to the base support. FIG. 26 further illustrates that the electrical connection to the side facing the plate is made by contact with the plate. It is otherwise difficult to make this connection. The wires connected to the other side of each transducer are connected to the signal as a differential pair, much like the output of a strain gauge bridge.

The piezoelectric transducers 2036 may be formed of a polymer or ceramic material. In addition, the piezoelectric transducers 2036 comprise thin plates with the poles on opposite sides of the smallest dimension. One poled face is attached parallel with the input pad, which comprises the most sensitive orientation.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not expressly recited, except in the specification. Accordingly, the scope of

What is claimed and desired to be secured by Letters Patent is:

1. An input device suitable for determining at least a location of an applied force, the input device comprising:
   a base support having a periphery and a plurality of apertures formed near the periphery and extending completely through the base support to define inner and outer portions, the inner portion being movable relative to the outer portion;
   an input pad associated with the inner portion and adapted to receive the applied force;
   a plurality of isolated beam segments defined by the plurality of apertures operable to receive resultant forces as distributed to the isolated beam segments by the displacement of the input pad and the inner portion,
   wherein each isolated beam segment comprises at least one sensor that measures the strain within the respective isolated beam segment occurring as a result of the displacement of the input pad and the inner portion in response to the applied force, the at least one sensor also being configured to output a signal corresponding to the applied force and the measured strain to be used to determine a location of the applied force.

2. The input device of claim 1, further comprising processing means operable with the at least one sensor to receive the signal and to determine at least one of the location and a magnitude of the applied force acting on the input pad.

3. The input device of claim 1, wherein the plurality of apertures comprise elongated slots extending orthogonally through the base support.

4. The input device of claim 1, wherein the plurality of apertures comprise a geometric configuration selected from a linear configuration, a curved configuration, a spline configuration, and any combination of these.

5. The input device of claim 1, wherein the at least one sensor comprises a strain gauge associated with each isolated beam segment that functions to measure a strain differential across the isolate beam segment.

6. The input device of claim 1, wherein each of the at least one sensors located on each of the isolated beam segments are located in a common sensor plane with respect to one another.

7. The input device of claim 6, wherein the sensor plane is parallel to a plane of the input pad.

8. The input device of claim 1, wherein the input pad further comprises:
   a large central aperture, disposed in the inner portion of the base support; and
   a removable force panel, disposed in the large aperture and mounted to the inner portion, configured to receive the applied force, and transmit resultant forces to the base support.

9. The input device of claim 1, wherein the plurality of apertures are through-slots in the base support, the apertures being configured to control the path of forces that are transmitted from the input pad to the periphery of the base support.

10. The input device of claim 1, wherein the plurality of isolated beam segments further comprise:
    an inner juncture, formed with the inner portion;
    a periphery juncture, formed with the outer portion of the base support, wherein the inner juncture and periphery juncture function to concentrate the stresses induced on the base support from the applied force within the isolated beam segments by deflecting in opposite directions.

11. The input device of claim 1, wherein the base support comprises a substantially planar structure having a first side and a second side, each configured to receive an applied force thereon.

12. The input device of claim 1, wherein the base support comprises a geometry selected from the group consisting of a polygonal geometry, an arbitrary geometry, and any combination of these.

13. The input device of claim 1, wherein the at least one sensor is selected from the group consisting of a strain gauge, a liquid level sensor, piezoelectric transducers, and a laser sensor.

14. The input device of claim 1, wherein the at least one sensor comprises a strain gauge located along each of the isolated beam segments, the strain gauges being configured to measure a strain differential across the beam segment upon deflection.

15. The input device of claim 1, wherein the plurality of apertures define a rectangular input pad and isolated beam segments near corners of, and parallel to, sides of the input pad.

16. The input device of claim 1, wherein the plurality of apertures define a rectangular input pad and isolated beam segments near corners of, and at an oblique angle to, sides of the input pad.

17. The input device of claim 1, wherein the plurality of apertures define a rectangular input pad and isolated beam segments near a center of, and parallel to, sides of the input pad.

18. The input device of claim 1, wherein the plurality of apertures extend parallel to sides of the input pad between two sensors and orthogonally to sides of the input pad at the two sensors.

19. The input device of claim 1, wherein the plurality of apertures comprise a change in width that corresponds to each of the isolated beam segments.

20. The input device of claim 1, wherein the plurality of apertures define a rectangular input pad including two adjacent isolated beam segments near corners of the input pad.

21. The input device of claim 1, wherein the plurality of apertures comprise a stress concentrating notch that corresponds to each of the at least one sensors located on each of the isolated beam segments.

22. The input device of claim 1, wherein each of the isolated beam segments has a subsurface hole extending at least partially through the isolated beam segment near each of the at least one sensors.

23. The input device of claim 1, wherein the isolated beam segments further comprise at least two holes associated therewith, each hole located on an opposite side of the isolated beam segment and being configured to concentrate stresses in the isolated beam segment, wherein each hole extends into the isolated beam segment toward the at least one sensor.

24. The input device of claim 1, further comprising two parallel sensors disposed at a first end of each isolated beam segment, and two parallel sensors disposed at a second, opposite end of each isolated beam segment.

25. The input device of claim 1, further comprising sealing means configured to seal and protect the touch pad and its component parts from foreign objects, moisture, and debris.

26. The input device of claim 1, wherein the input pad is integrally formed with the inner portion, the input pad being part of the base support.

27. The input device of claim 1, wherein the isolated beam segments are comprised of a piezoelectric material, wherein the isolated beam segments themselves function as the sensor.

28. An input device configured to receive an applied force, the input device comprising:
a first structural element supported in a fixed position;
a second structural element operable with the first structural element, and dynamically supported to be movable with respect to the first structural element under the applied force;
an input pad associated with the movable second structural element and adapted to receive the applied force;
a plurality of isolated beam segments joining said first and second structural elements, the isolated beam segments being operable to transfer forces between the first and second structural elements, and to receive resultant forces distributed to the isolated beam segments upon the displacement of the input pad,
wherein each isolated beam segment comprises at least one sensor that measures the strain within the respective isolated beam segment occurring as a result of various stresses transmitted to the isolated beam segments by the displacement of the input pad in response to the applied force, each of the sensors also being configured to output a signal corresponding to the applied force and the measured strain to be used to determine a location of the applied force,
wherein the first and second structural elements and the isolated beam segments make up a common base support, and are each defined by a plurality of apertures that extend completely through the base support.

29. The input device of claim 28, wherein the first structural element comprises an outer mounting surface, and the second structural element comprises the input pad as circumscribed by the outer mounting surface and an inner mounting surface.

30. The input device of claim 28, wherein the first structural element comprises an inner mounting surface, and the second structural element comprises the input pad as positioned about the periphery of the input device, wherein an outer mounting surface and the inner mounting surface are circumscribed by the input pad.

31. A method for making a touch pad device, comprising the steps of:
providing a base support capable of receiving an applied force;
forming apertures near peripheral locations of the base support that extend completely through the base support to define an outer portion, and an inner portion that is movable relative to the outer portion, and a plurality of isolated beam segments;
providing an input pad to be associated with the inner portion, and configured to displace with the inner portion in response to an applied force; and
configuring each of the isolated beam segments to comprise at least one sensor that measures a strain within the plurality of isolated beam segments occurring as a result of the displacement of the input pad and the inner portion in response to the applied force, and to output a signal corresponding to the applied force to be used to determine the location of the applied force.

32. The method of claim 31, further comprising providing processing means for processing the output signal from the sensors to determine at least one of the location and a magnitude of the applied force.

33. A method for determining at least one of location and magnitude of a force applied to an input pad, the method comprising:
providing a base support having:
a periphery;
a plurality of apertures extending completely through the base support near the periphery that define an outer portion, an inner portion movable relative to the outer portion, and a plurality of isolated beam segments, wherein each isolated beam segment comprises at least one sensor; and
an input pad associated with the inner portion and configured to displace in response to the force;
measuring the strain within the plurality of isolated beam segments, which strain occurs as a result of various stresses created by the displacement of the input pad and the inner portion in response to the force as applied thereto;
generating an output signal corresponding to the measured strain; and
processing the output signal to determine the location of the force applied to the input pad.

34. The method of claim 33, further comprising processing the output signal to determine the magnitude of the force applied to the input pad.

35. A method for determining at least one of location and magnitude of a force applied to an input pad, the method comprising:
providing a first fixed structural element;
providing a second structural element operable with the first structural element and being movable relative to the first structural element, wherein the first and second structural elements are joined by a plurality of isolated beam segments operable to transfer forces between the first and second structural elements, and to receive resultant forces distributed to the isolated beam segments by the displacement of the second structural element, wherein each isolated beam segment comprises at least one sensor, and wherein the first and second structural elements and the isolated beam segments make up a common base support, and are each defined by a plurality of apertures that extend completely through the base support;
providing an input pad associated with the movable second structural element to receive the applied force;
measuring the strain within the plurality of isolated beam segments, which strain occurs as a result of various stresses transmitted to the isolated beam segments by the displacement of the input pad and second structural element in response to the applied force;
generating an output signal corresponding to the measured strain; and
processing the output signal to determine the location of the force applied to the input pad.

36. The method of claim 35, further comprising processing the output signal to determine the magnitude of the force applied to the input pad.

37. An input device suitable for determining at least a location of an applied force, the input device comprising:
a base support having a periphery and a plurality of apertures formed near the periphery that extend completely through the base support to define inner and outer portions, the inner portion being movable relative to the outer portion;
an input pad associated with the inner portion and configured to receive an applied force;
a plurality of deflecting beam segments isolated from the periphery and the input pad and formed by respective overlapping end segments of the plurality of apertures, the beam segments having a periphery juncture connecting the outer portion and an inner juncture connecting the inner portion, the inner and periphery junctures bending in opposing directions upon deflection of the isolated beam segments, the isolated beam segments being operable to receive resultant forces as distributed to the isolated beam segments by the displacement of the input pad and the inner portion,
wherein each isolated beam segment comprises at least one sensor that measures the strain within the respective isolated beam segment occurring as a result of the displacement of the input pad and the inner portion in response to the applied force, the at least one sensor also being configured to output a signal corresponding to the applied force and the measured strain to be used to determine a location of the applied force.

\* \* \* \* \*